United States Patent
Yamaguchi

(10) Patent No.: US 12,272,156 B2
(45) Date of Patent: Apr. 8, 2025

(54) IMAGE PROCESSING APPARATUS, VEHICLE CONTROL APPARATUS, METHOD, AND PROGRAM

(71) Applicant: Sony Semiconductor Solutions Corporation, Kanagawa (JP)

(72) Inventor: Takuya Yamaguchi, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 331 days.

(21) Appl. No.: 17/440,690

(22) PCT Filed: Mar. 25, 2020

(86) PCT No.: PCT/JP2020/013471
§ 371 (c)(1),
(2) Date: Sep. 17, 2021

(87) PCT Pub. No.: WO2020/196676
PCT Pub. Date: Oct. 1, 2020

(65) Prior Publication Data
US 2022/0172490 A1  Jun. 2, 2022

(30) Foreign Application Priority Data

Mar. 26, 2019 (JP) ................................. 2019-057648

(51) Int. Cl.
*G06V 20/58* (2022.01)
*B60W 30/06* (2006.01)
(Continued)

(52) U.S. Cl.
CPC ........... *G06V 20/586* (2022.01); *B60W 50/14* (2013.01); *B60W 60/001* (2020.02);
(Continued)

(58) Field of Classification Search
CPC ........ G06V 20/586; G06V 20/58; G06T 7/70; G06T 11/00; G06T 2207/30264;
(Continued)

(56) References Cited

U.S. PATENT DOCUMENTS 10,089,770 B2 * 10/2018 Kobayashi ................ G06T 7/20
10,326,927 B2 * 6/2019 Sasaki ...................... G01C 3/06
(Continued)

FOREIGN PATENT DOCUMENTS

CN          101641718 A    2/2010
CN          108028023 A    5/2018
(Continued)

OTHER PUBLICATIONS

Written Opinion and English translation thereof mailed Jun. 16, 2020 in connection with International Application No. PCT/JP2020/013471.

(Continued)

*Primary Examiner* — Aniss Chad
*Assistant Examiner* — Christopher George Fees
(74) *Attorney, Agent, or Firm* — Wolf, Greenfield & Sacks, P.C.

(57) ABSTRACT

Provided are an apparatus and a method for generating a two-dimensional map or a surround-view image in which an object with low position reliability is set as an enlarged display object. A data processing section configured to receive an image captured by a camera that captures the image of surroundings of a vehicle and generate a two-dimensional map including objects in the surroundings of the vehicle is included. The data processing section generates the two-dimensional map or a surround-view image including an enlarged display object having an enlarged (Continued)

region set thereto, the enlarged region which, in case of an object with low position reliability, extends around the object.

16 Claims, 17 Drawing Sheets

(51) Int. Cl.
*B60W 50/14* (2020.01)
*B60W 60/00* (2020.01)
*G01C 21/00* (2006.01)
*G06T 7/70* (2017.01)
*G06T 11/00* (2006.01)

(52) U.S. Cl.
CPC ..... *G01C 21/3807* (2020.08); *G01C 21/3837* (2020.08); *G06T 7/70* (2017.01); *G06T 11/00* (2013.01); *B60W 30/06* (2013.01); *B60W 2050/146* (2013.01); *B60W 2420/403* (2013.01); *G06T 2207/30264* (2013.01)

(58) Field of Classification Search
CPC .... B60W 60/001; B60W 50/14; B60W 30/06; B60W 2050/146; B60W 2420/42; G01C 21/3837; G01C 21/3807; B60R 1/22; B60R 2300/307; B60R 2300/607; G08G 1/0962; G08G 1/165; G08G 1/168; H04N 7/181
See application file for complete search history.

(56) References Cited

U.S. PATENT DOCUMENTS

| | | | | |
|---|---|---|---|---|
| 10,943,141 | B2* | 3/2021 | Sawada | G06V 20/58 |
| 11,009,344 | B2* | 5/2021 | Natori | G06V 20/695 |
| 11,124,182 | B2* | 9/2021 | Takagi | G01S 13/589 |
| 2009/0128686 | A1 | 5/2009 | Yamashita | |
| 2016/0248967 | A1* | 8/2016 | Sasaki | G01C 3/06 |
| 2016/0364619 | A1* | 12/2016 | Ogata | G06T 7/50 |
| 2017/0028914 | A1* | 2/2017 | Kiyokawa | G01C 21/3415 |
| 2017/0054946 | A1 | 2/2017 | Lee | |
| 2017/0120907 | A1* | 5/2017 | Wolf | B60W 50/14 |
| 2017/0297488 | A1* | 10/2017 | Wang | G06T 5/006 |
| 2017/0344021 | A1 | 11/2017 | Sano et al. | |
| 2017/0344844 | A1 | 11/2017 | Sano et al. | |
| 2018/0086271 | A1* | 3/2018 | Kosugi | H04N 5/44504 |
| 2018/0281680 | A1 | 10/2018 | Gerardo Castro | |
| 2019/0122037 | A1* | 4/2019 | Russell | G06V 20/58 |
| 2019/0263263 | A1 | 8/2019 | Shimotani et al. | |
| 2020/0168096 | A1* | 5/2020 | Eckstein | B60W 50/14 |
| 2020/0333789 | A1* | 10/2020 | Suzuki | G01S 17/89 |
| 2020/0334843 | A1* | 10/2020 | Kasuya | G01S 17/86 |
| 2021/0110188 | A1* | 4/2021 | Otsubo | G06V 20/58 |
| 2021/0192250 | A1* | 6/2021 | Matono | G06V 20/582 |

FOREIGN PATENT DOCUMENTS

| | | |
|---|---|---|
| EP | 3252658 A1 | 12/2017 |
| JP | 2009-250785 A | 10/2009 |
| JP | 2010-079561 A | 4/2010 |
| JP | 2013-053962 A | 3/2013 |
| JP | 2017-215940 A | 12/2017 |
| WO | WO 2018/078732 A1 | 5/2018 |

OTHER PUBLICATIONS

International Preliminary Report on Patentability and English translation thereof mailed Oct. 7, 2021 in connection with International Application No. PCT/JP2020/013471.

Extended European Search Report issued Apr. 26, 2022 in connection with European Application No. 20777349.0.

International Search Report and English translation thereof mailed Jun. 16, 2020 in connection with International Application No. PCT/JP2020/013471.

* cited by examiner

F I G. 1
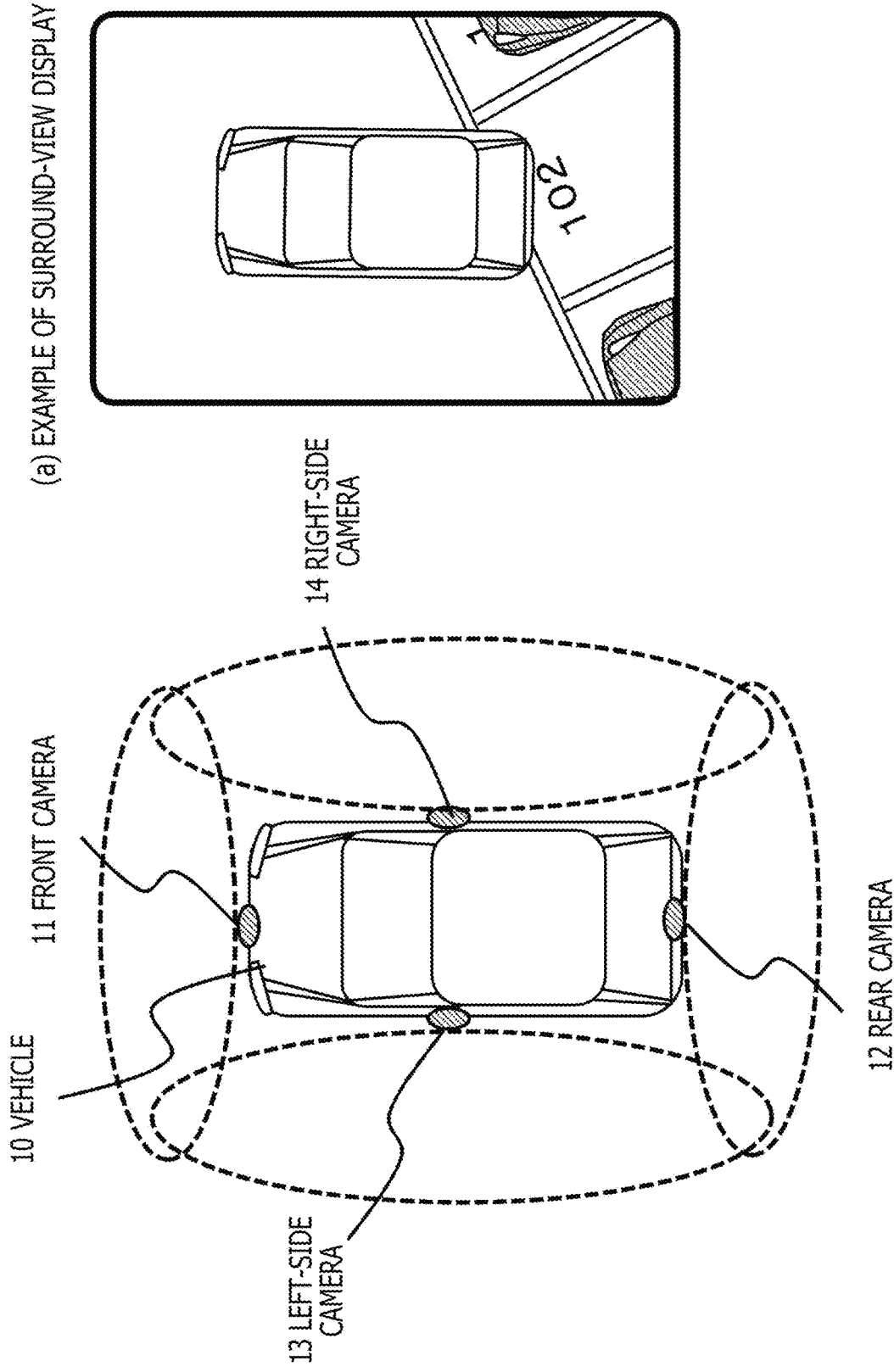

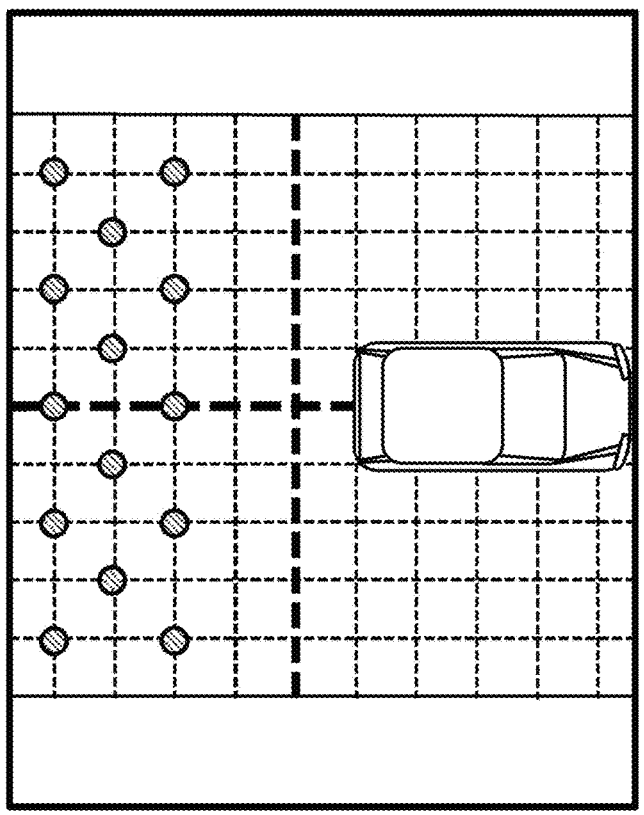
(2) OVERHEAD IMAGE
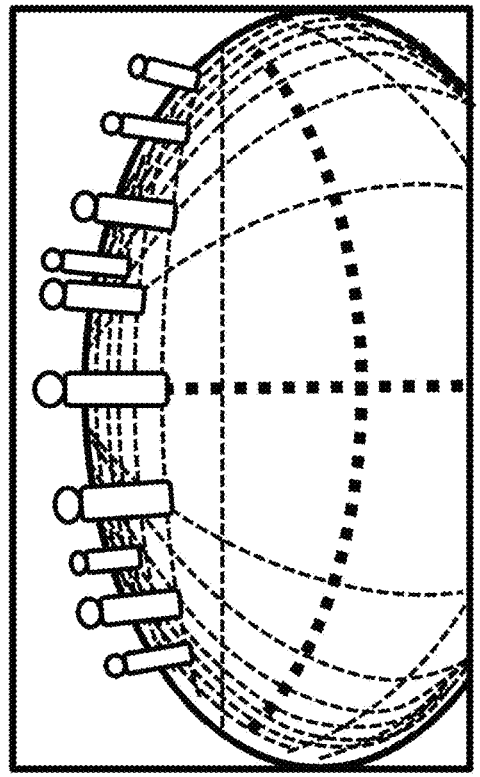
(1) IMAGE CAPTURED BY REAR CAMERA
FIG. 4

F I G. 5
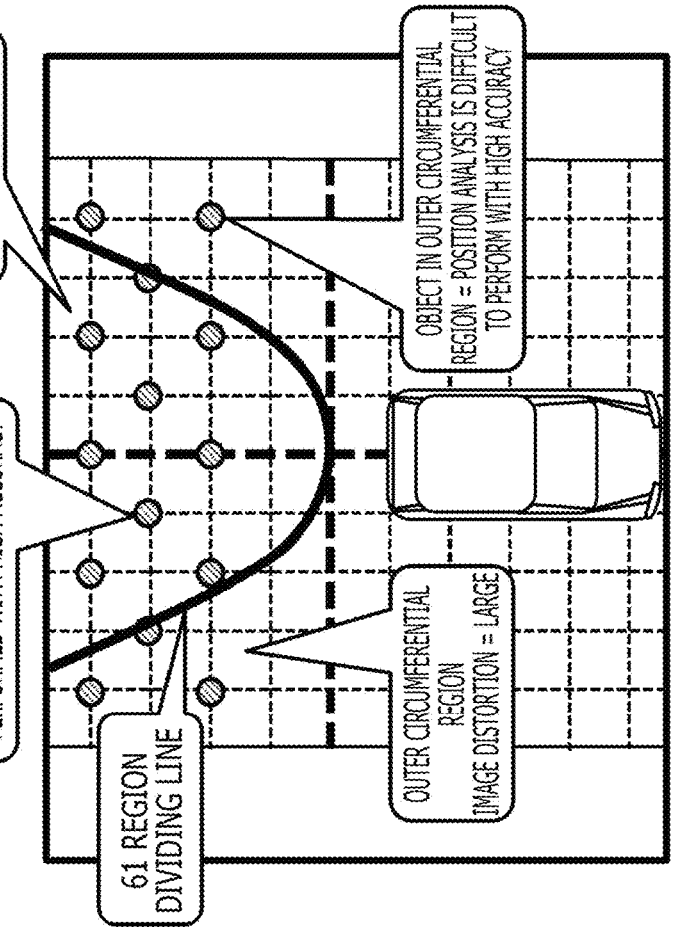
(2) OVERHEAD IMAGE
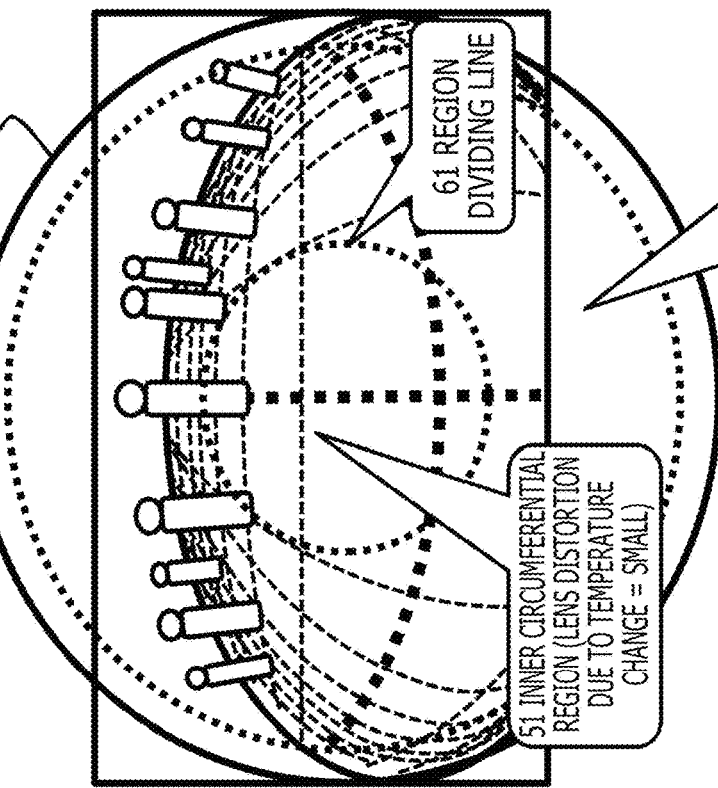
(1) IMAGE CAPTURED BY REAR CAMERA

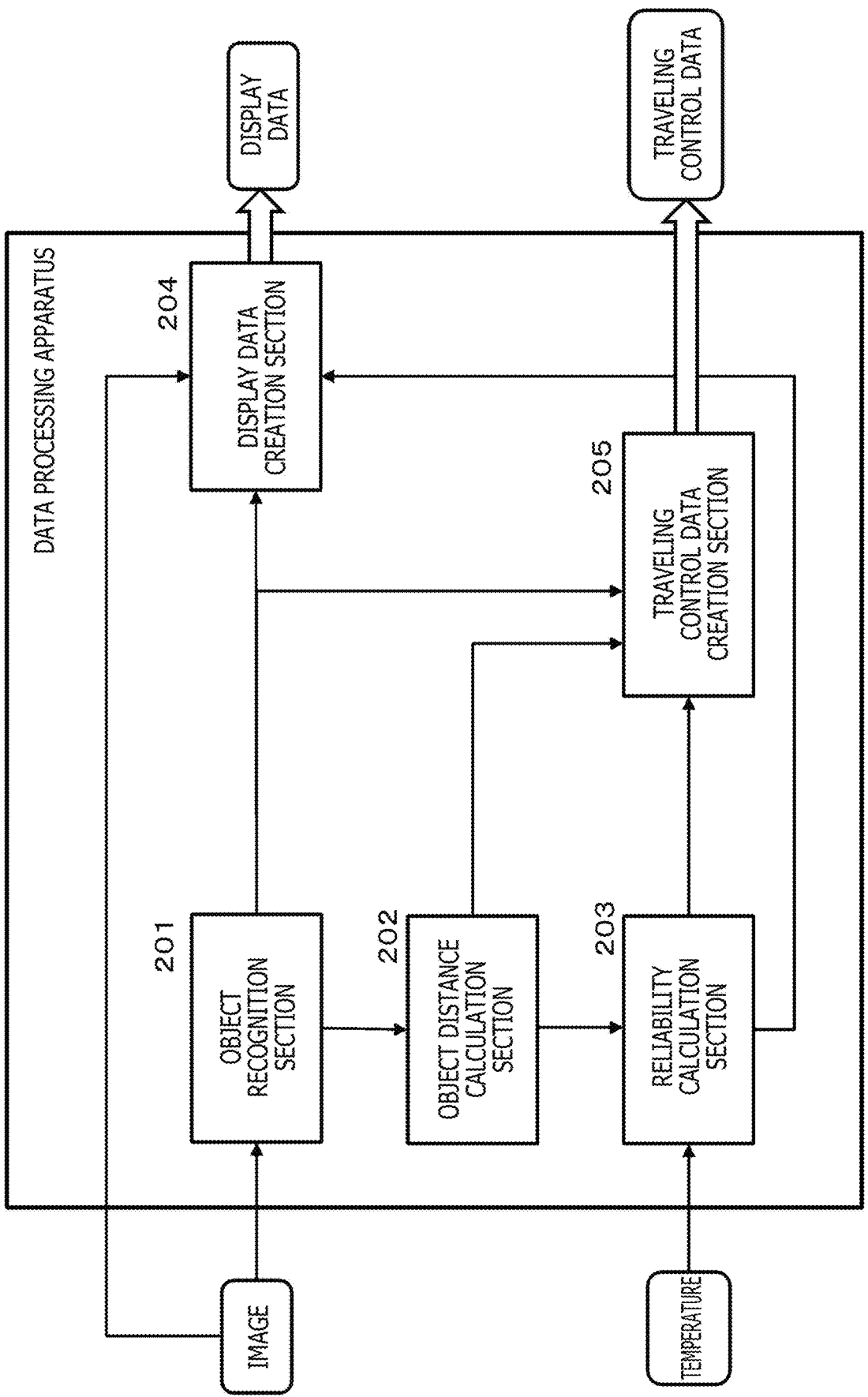

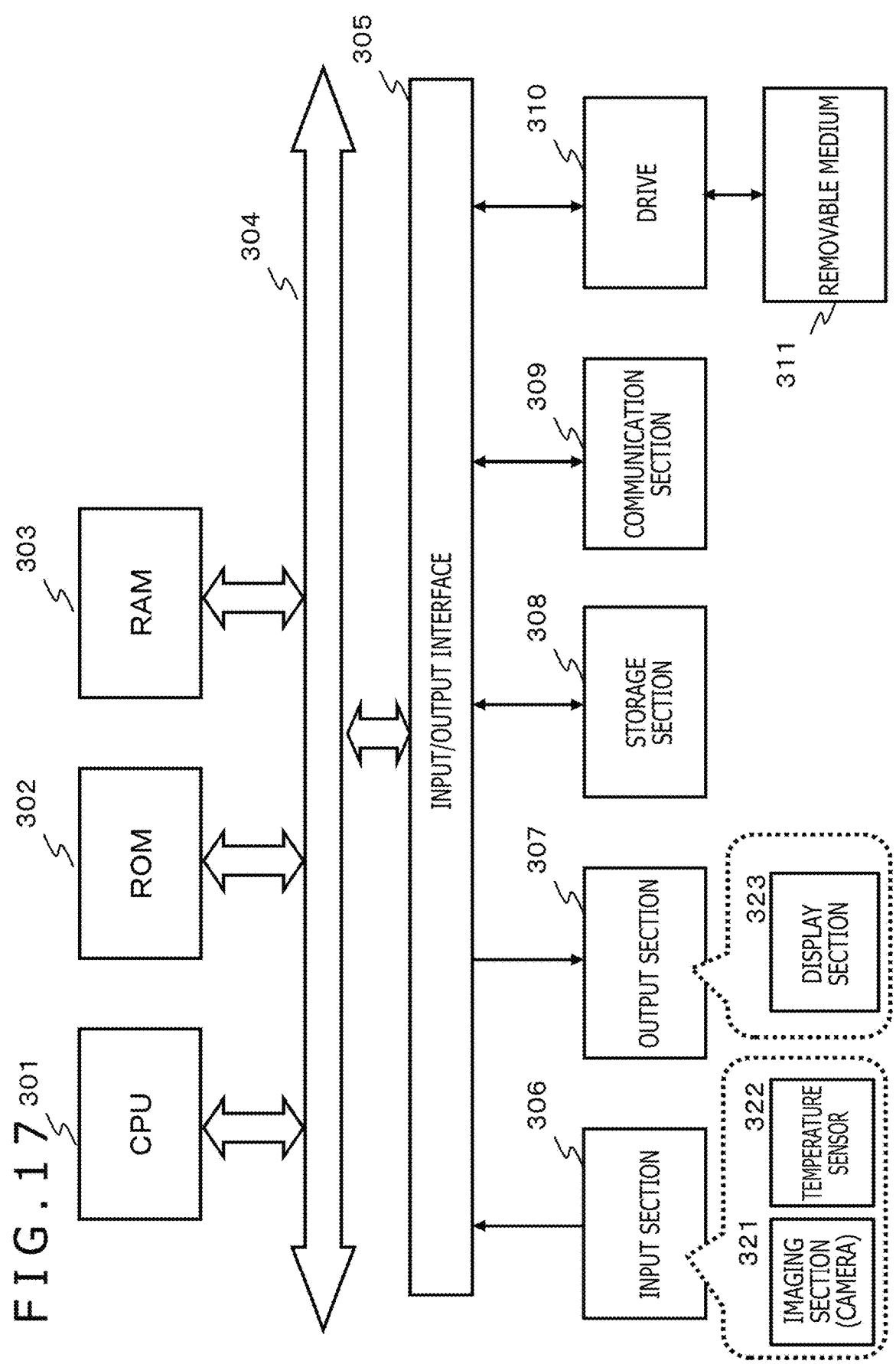

IMAGE PROCESSING APPARATUS, VEHICLE CONTROL APPARATUS, METHOD, AND PROGRAM

CROSS-REFERENCE TO RELATED APPLICATIONS

This application claims the benefit under 35 U.S.C. § 371 as a U.S. National Stage Entry of International Application No. PCT/JP2020/013471, filed in the Japanese Patent Office as a Receiving Office on Mar. 25, 2020, which claims priority to Japanese Patent Application Number JP2019-057648, filed in the Japanese Patent Office on Mar. 26, 2019, each of which is hereby incorporated by reference in its entirety.

TECHNICAL FIELD

The present disclosure relates to an image processing apparatus, a vehicle control apparatus, a method, and a program. Specifically, the present disclosure relates to an image processing apparatus, a vehicle control apparatus, a method, and a program for detecting various obstacles from images captured by cameras attached to a vehicle and realizing safe traveling, for example.

BACKGROUND ART

Many vehicles which include an automated parking application have been used in recent years. The automated parking application is a software program that causes a vehicle to perform automated parking while checking surroundings of the vehicle with images captured by cameras.

The in-vehicle cameras used by the automated parking application are generally wide-angle cameras including a fisheye lens or the like with an angle of view of approximately 180 degrees. Videos captured by the in-vehicle cameras mounted at four locations around the vehicle are combined to obtain a 360° surrounding image of the host vehicle and detect obstacles in the entire surroundings from the images.

For example, the automated parking application analyzes the positions of objects such as a parking space and obstacles (such as vehicles, pedestrians, curbs, and car stops) in the surroundings of the vehicle from the images obtained by the in-vehicle cameras, places these objects on a map in a memory on the basis of the analyzed position information, determines such a traveling route that the vehicle can accurately park within the parking space without contacting the obstacles, and performs control to cause the vehicle to travel the traveling route.

However, if the cameras mounted in the vehicle become a high or low temperature state, distortion occurs in camera lenses. Consequently, generally-called lens image height characteristics change and object image-capturing positions deviate in the images. Performing object position analysis using such images generates a problem that accurate position data cannot be obtained.

It is noted that PTL 1 (Japanese Patent Application Laid-Open No. 2009-250785) is an example of a conventional technique that discloses a configuration for performing a process of correcting images including errors due to a temperature change.

PTL 1 discloses a configuration in which a change in baseline length corresponding to the space between two lenses is measured and a subject distance is corrected on the basis of a measured amount of baseline length change in a configuration for measuring a distance to a subject using a fly-eye lens.

However, the method described in this document is specialized in the configuration in which the subject distance is measured using the fly-eye lens and is not applicable to the correction of images captured by in-vehicle cameras which are not fly-eye lenses.

CITATION LIST

Patent Literature

[PTL 1]
JP 2009-250785 A

SUMMARY

Technical Problems

It is an object of the present disclosure to provide an image processing apparatus, a vehicle control apparatus, a method, and a program that enable safe traveling by preventing a vehicle from contacting or colliding with objects in captured images even in a case where distortion occurs in lenses of cameras mounted in the vehicle due to a temperature change.

Solution to Problems

A first aspect according to the present disclosure lies in an image processing apparatus including a data processing section configured to receive an image captured by a camera that captures the image of surroundings of a vehicle and generate a two-dimensional map including objects in the surroundings of the vehicle, in which the data processing section generates the two-dimensional map including an enlarged display object having an enlarged region set thereto, the enlarged region which, in case of an object with low position reliability among the objects in the two-dimensional map, extends around the object.

Further, a second aspect according to the present disclosure lies in a vehicle control apparatus including a data processing section configured to receive an image captured by a camera that captures the image of surroundings of a vehicle and generate a two-dimensional map including objects in the surroundings of the vehicle, and a vehicle control section configured to determine a traveling route by referring to the two-dimensional map generated by the data processing section and perform control to cause the vehicle to travel the traveling route, in which the data processing section generates the two-dimensional map including an enlarged display object having an enlarged region set thereto, the enlarged region which, in case of an object with low position reliability among the objects in the two-dimensional map, extends around the object, and the vehicle control section selects the traveling route on which the vehicle does not contact the enlarged display object placed on the two-dimensional map and performs the control to cause the vehicle to travel the traveling route.

Further, a third aspect according to the present disclosure lies in an image processing method performed by an image processing apparatus, the image processing apparatus including a data processing section configured to receive an image captured by a camera that captures the image of surroundings of a vehicle and generate a two-dimensional map including objects in the surroundings of the vehicle, the image processing method including, by the data processing section, generating the two-dimensional map including an enlarged display object having an enlarged region set thereto, the enlarged region which, in case of an object with low position reliability among the objects in the two-dimensional map, extends around the object.

Further, a fourth aspect according to the present disclosure lies in a vehicle control method performed by a vehicle control apparatus, the vehicle control apparatus including a data processing section configured to receive an image captured by a camera that captures the image of surroundings of a vehicle and generate a two-dimensional map including objects in the surroundings of the vehicle, and a vehicle control section configured to determine a traveling route by referring to the two-dimensional map generated by the data processing section and perform control to cause the vehicle to travel the traveling route, the vehicle control method including, by the data processing section, generating the two-dimensional map including an enlarged display object having an enlarged region set thereto, the enlarged region which, in case of an object with low position reliability among the objects in the two-dimensional map, extends around the object, and by the vehicle control section, selecting the traveling route on which the vehicle does not contact the enlarged display object placed on the two-dimensional map and performing the control to cause the vehicle to travel the traveling route.

Further, a fifth aspect according to the present disclosure lies in a program causing an image processing apparatus to perform image processing, the image processing apparatus including a data processing section configured to receive an image captured by a camera that captures the image of surroundings of a vehicle and generate a two-dimensional map including objects in the surroundings of the vehicle, the program causing the data processing section to generate the two-dimensional map including an enlarged display object having an enlarged region set thereto, the enlarged region which, in case of an object with low position reliability among the objects in the two-dimensional map, extends around the object.

Further, a sixth aspect according to the present disclosure lies in a program causing a vehicle control apparatus to perform a vehicle control process, the vehicle control apparatus including a data processing section configured to receive an image captured by a camera that captures the image of surroundings of a vehicle and generate a two-dimensional map including objects in the surroundings of the vehicle, and a vehicle control section configured to determine a traveling route by referring to the two-dimensional map generated by the data processing section and perform control to cause the vehicle to travel the traveling route, the program causing the data processing section to generate the two-dimensional map including an enlarged display object having an enlarged region set thereto, the enlarged region which, in case of an object with low position reliability among the objects in the two-dimensional map, extends around the object, and the vehicle control section to select the traveling route on which the vehicle does not contact the enlarged display object placed on the two-dimensional map and perform the control to cause the vehicle to travel the traveling route.

It is noted that the program according to the present disclosure is, for example, a program that can be provided by a storage medium or a communication medium that provides various program codes in a computer readable form to an information processing apparatus or a computer system that can execute those various program codes. By providing such a program in the computer readable form, processing corresponding to the program is realized on the information processing apparatus or the computer system.

Still other objects, features, and advantages of the present disclosure will become apparent from more detailed description based on an embodiment of the present disclosure to be described later and attached drawings. It is noted that, in the present specification, a system refers to a configuration in which a plurality of apparatuses is logically grouped and is not limited to a configuration in which individually configured apparatuses are provided in the same housing.

According to the configurations of one embodiment of the present disclosure, an apparatus and a method for generating a two-dimensional map or a surround-view image in which an object with low position reliability is set as an enlarged display object are realized.

Specifically, for example, a data processing section configured to receive an image captured by a camera that captures the image of surroundings of a vehicle and generate a two-dimensional map including objects in the surroundings of the vehicle is included. The data processing section generates the two-dimensional map or a surround-view image including an enlarged display object having an enlarged region set thereto, the enlarged region which, in case of an object with low position reliability, extends around the object. The data processing section determines that an object whose image height is equal to or greater than a predetermined image height threshold is an object with low position reliability, while determining that an object whose image height is not equal to or greater than the image height threshold is an object with high position reliability.

With these configurations, the apparatus and the method for generating the two-dimensional map or the surround-view image in which the object with low position reliability is set as the enlarged display object are realized.

It is noted that the effects described in the present specification are merely examples and are not limited. Further, additional effects may be provided.

BRIEF DESCRIPTION OF DRAWINGS

FIG. 1 depicts diagrams for describing an overview of a surround-view camera system.

FIG. 4 depicts diagrams for describing the overview of the process of converting the image captured by the camera.

FIG. 5 depicts diagrams for describing a phenomenon in which object image-capturing positions deviate in an image.

FIG. 16 is a diagram for describing an example of a configuration of a data processing apparatus in the image processing system (vehicle control system) according to the present disclosure.

FIG. 17 is a diagram for describing an example of a hardware configuration of the image processing system (vehicle control system) according to the present disclosure.

DESCRIPTION OF EMBODIMENTS

Figure 2:
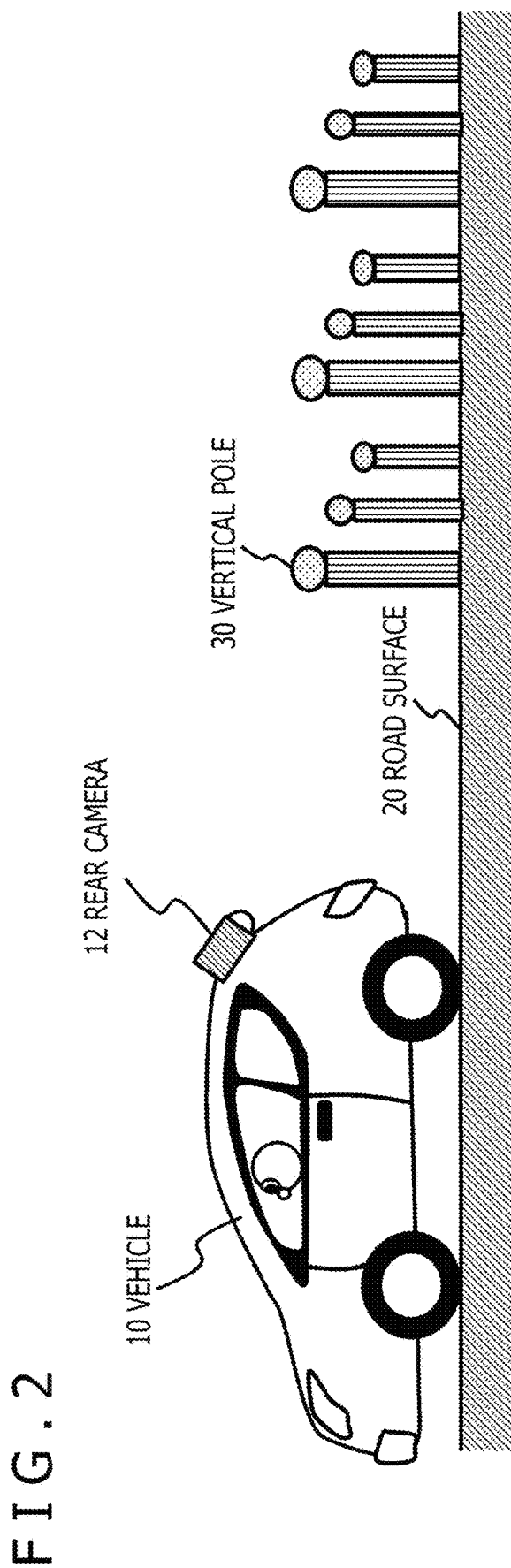
FIG. 2 is a diagram for describing an overview of a process of converting an image captured by a camera.

Hereinafter, an image processing apparatus, a vehicle control apparatus, a method, and a program according to the present disclosure will be described in detail with reference to the drawings. It is noted that description is made according to the following items.

1. Regarding Overview of Surround-View Camera System
2. Regarding Process of Converting Images Captured by Cameras, and Lens Distortion Due to Temperature Change and Decrease in Accuracy of Object Position Detection
3. Regarding Sequence of Processing Performed by Image Processing Apparatus According to Present Disclosure
4. Regarding Example of Processing for Using Two-Dimensional Map for Automated Driving
5. Regarding Other Embodiments
6. Regarding Example of Configuration of Image Processing System (Vehicle Control System)
7. Regarding Example of Hardware Configuration of Image Processing System (Vehicle Control System)
8. Summary of Configurations of Present Disclosure

1. Regarding Overview of Surround-View Camera System

First, an overview of a surround-view camera system included in recent vehicles will be described.

FIG. 1 depicts diagrams for describing the overview of the surround-view camera system. The diagram on the left side of the figure illustrates a vehicle 10 including the surround-view camera system. The vehicle 10 includes cameras at four locations: front, rear, left, and right. These cameras are a front camera 11, a rear camera 12, a left-side camera 13, and a right-side camera 14 illustrated in the diagram.

Each of these cameras has a wide-angle lens such as a fisheye lens, for example, and can capture an image of a wider wide-angle area. For example, each dotted-line region illustrated in the figure represents a region to be captured by the corresponding camera. Performing image processing on the images captured by these four cameras can generate an image observed from above the vehicle.

An image illustrated on the right side of FIG. 1 represents an example of a display image generated as a result of image processing. This image is displayed on a driver's seat display section. It is noted that the vehicle in the center of this display image is virtual data and is not obtained from the images captured by the cameras.

The image representing the surroundings of the vehicle is an image generated by the image processing based on the images captured by the four cameras. Pasting an image of the host vehicle onto the center of this image generates an image similar to the one as if the vehicle were observed from above.

This virtual observation image representing an image from above the vehicle is called a "surround-view image," an "overhead image," a "bird's eye view image," or the like.

A driver can check this image via the monitor (display section) at the driver's seat and can perform safe traveling, for example, perform driving operations such as backing or parking, while checking obstacles and the like in the surroundings of the vehicle.

Further, an automated parking application is also used. The automated parking application automatically analyzes the situation around the vehicle using the images captured by the cameras and performs automated driving by which the vehicle parks without requiring the driver to perform driving operations.

For example, the automated parking application identifies the positions of objects such as a parking space and obstacles (such as vehicles, pedestrians, curbs, and car stops) by analyzing the above-described "surround-view image." Moreover, the automated parking application places each identified object position on the "two-dimensional map"=a map in a memory and performs automated traveling by controlling the vehicle such that the vehicle can park accurately within the parking space without contacting the obstacles. In this manner, the automated parking application causes the vehicle to park at a predetermined parking position.

However, for example, if the cameras mounted in the vehicle become a high or low temperature state, distortion occurs in the camera lenses. Consequently, generally-called lens image height characteristics change and object image-capturing positions deviate in the images.

If the driver drives while viewing such an image in which object positions deviate as described above, there is a possibility of contacting obstacles.

Further, there is a possibility that the automated parking application also incorrectly detects the positions of objects, resulting in a contact with an obstacle during the automated driving.

2. Regarding Process of Converting Images Captured by Cameras, and Lens Distortion Due to Temperature Change and Decrease in Accuracy of Object Position Detection Next, a process of converting images captured by the cameras, and lens distortion due to a temperature change, and a decrease in accuracy of object position detection will be described.

First, an overview of the process of converting images captured by the cameras will be described with reference to FIG. 2 and subsequent figures.

As described with reference to FIG. 1, the vehicle 10 includes the cameras that capture images in four directions of front, rear, left, and right, for example, and the images captured by these four cameras can be combined to generate an image observed from above the vehicle, that is, a "surround-view image."

Each camera has a wide-angle lens such as a fisheye lens and can capture an image of a wider wide-angle area. For example, each dotted-line region illustrated in FIG. 1 represents a region to be captured by the corresponding camera. Performing image processing on the images captured by these four cameras can generate an image observed from above the vehicle.

The following first describes an image captured by each camera and its conversion process. Basically, the image captured by each camera and the conversion process are performed in a manner similar to each other. As a representative example, the following describes an image captured by the rear camera 12 included in a rear portion of the vehicle 10 and an example of the conversion process.

The rear camera 12 is a wide-angle lens camera including a wide-angle lens such as a fisheye lens, for example, and can capture an image of a wide region behind the vehicle.

In the example illustrated in FIG. 2, the rear camera 12 captures an image of objects on a road surface behind the vehicle 10. Here, vertical poles 30 are depicted as the objects. This captured image is input into an image processing apparatus inside the vehicle 10. The image processing apparatus performs an image correction process, thereby generating an image (surround-view image) similar to the one viewed with naked eyes from above the vehicle, which is then displayed on, for example, the monitor at the driver's seat.

It is noted that data used by the vehicle 10 includes a surround-view image, a two-dimensional map, and vehicle surrounding space data, which is automated driving control data (a high-definition map and the like).

The surround-view image is obtained by combining a plurality of images from a plurality of imaging apparatuses and is an image representing the surroundings of the vehicle. A bird's eye view image is included in the surround-view image. The two-dimensional map refers to data that includes position information of each object in the surroundings of the vehicle. The two-dimensional map may include size information of each object and information regarding the distance from the vehicle to each object. The high-definition map refers to a map that represents a three-dimensional space in the surroundings of the vehicle. The automated driving control data refers to data used for automated driving control and may include the high-definition map.

Here, the surround-view image and the two-dimensional map are assumed to be used as display data to be presented to the driver of the vehicle. The automated driving control data such as the high-definition map may be used as the display data. Further, traveling control data refers to data for controlling the traveling of the vehicle. As the traveling control data, the automated driving control data such as the high-definition map and the two-dimensional map are used.

The "surround-view image" and the "two-dimensional map" described in the following description are examples of images to be used. The "two-dimensional map" may be used instead of the "surround-view image," and the "surround-view image" may be used instead of the "two-dimensional map."

Further, an image obtained by combining the "surround-view image" and the "two-dimensional map" may be used.

The "two-dimensional map (/surround-view image)" described in the following description means that either of these images may be used. Further, the two-dimensional map also includes a two-dimensional image.

Further, the "automated driving control data (high-definition map and the like)" may use the "surround-view image" or an image that is generated with high definition based on the "two-dimensional map."

It is noted that, as described above, the rear camera 12 is a wide-angle lens camera including a wide-angle lens such as a fisheye lens, for example, and can capture an image of a wide region behind the vehicle.

However, distortion occurs in the image captured using the wide-angle lens.

A specific example of distortion will be described with reference to FIG. 3 and subsequent figures.

Figure 3:
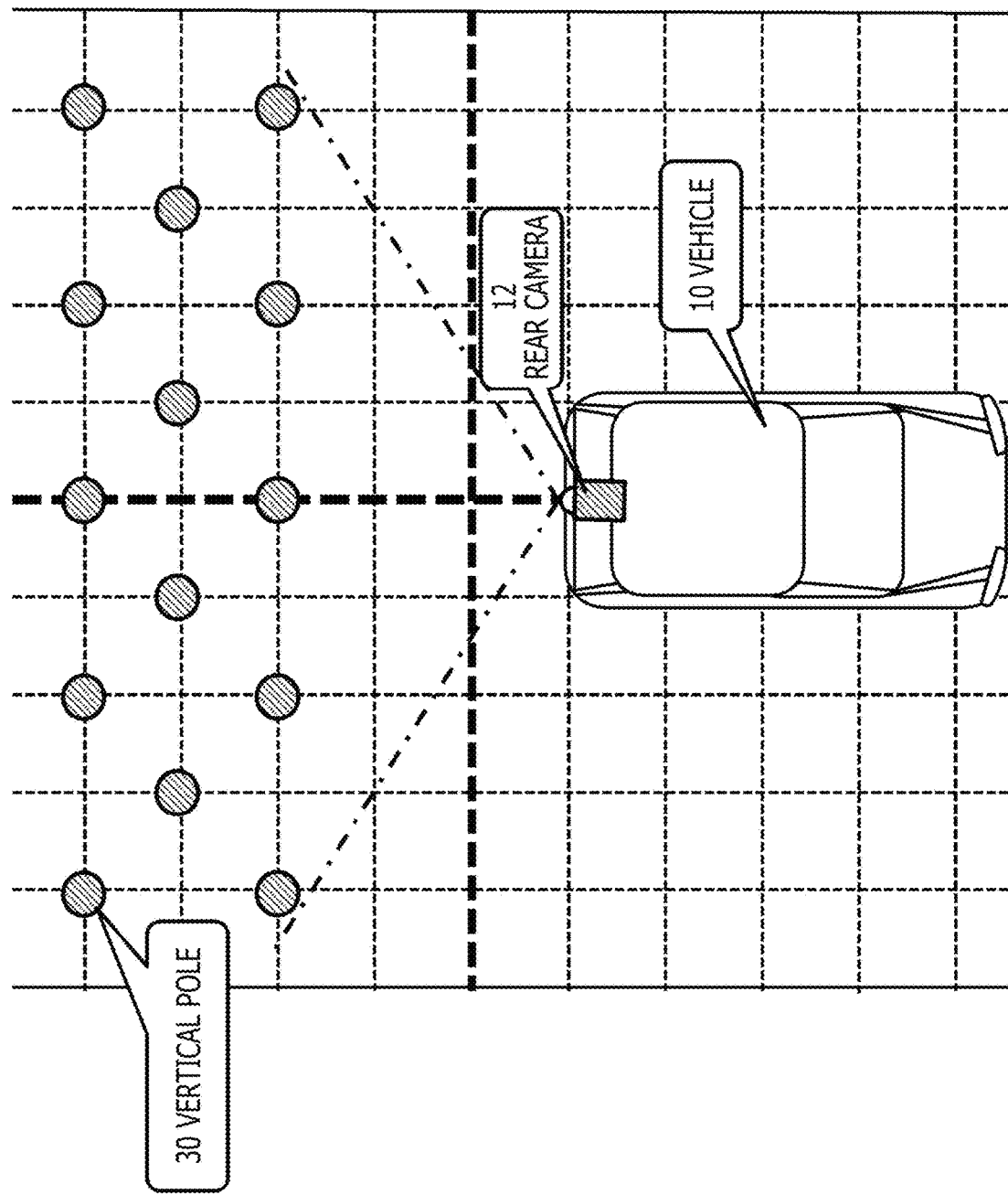
FIG. 3 is a diagram for describing the overview of the process of converting the image captured by the camera.

As illustrated in FIG. 3, the rear camera 12 is assumed to capture an image of a state in which a large number of vertical poles 30 stand behind the vehicle 10 on a road surface on which grid-like lines are depicted. The vertical poles 30 are similar to the vertical poles 30 illustrated in FIG. 2 and erected perpendicular to a road surface 20.

The rear camera 12 including the wide-angle lens captures an image of a region behind the vehicle 10 in which the large number of vertical poles 30 stand.

FIG. 4(1) is a captured image. As illustrated in FIG. 4(1), grid patterns on the road surface in the captured image have a curved distortion. Further, the vertical poles 30 closer to the periphery of the image appear to tilt more.

This is the image distortion that occurs when an image is captured using the wide-angle lens.

FIG. 4(2) is an overhead image as a corrected image generated by performing distortion correction and viewpoint conversion on the image of FIG. 4(1).

As the corrected image, the image processing apparatus generates an image (overhead image) similar to the one observed with naked eyes from above.

The overhead image from the images captured by the four cameras mounted on the front, rear, left, and right sides of the vehicle is generated and combined, so that the surround-view image described earlier with reference to FIG. 1 can be generated.

However, if the camera lenses become the high or low temperature state, distortion occurs. Consequently, generally-called lens image height characteristics change, and object image-capturing positions deviate in the images.

This phenomenon will be described with reference to FIG. 5 and subsequent figures.

FIG. 5(1) is a captured image captured by the rear camera 12 including the wide-angle lens, as described with reference to FIG. 4(1).

The lens of the rear camera 12, that is, a camera lens 50 is superimposed and depicted on this captured image.

A material such as glass or plastic is used for the camera lens, for example. In a case where a glass lens is used, rates of expansion and contraction due to the temperature change are small. Therefore, the occurrence of lens distortion is negligible. However, in the case of a plastic lens, the rates of expansion and contraction due to the temperature change are large, resulting in large lens distortion.

Image height deviation is an indicator indicating a positional deviation of a subject image-capturing position due to this lens distortion.

Image height is a value that represents an image position on an evaluation surface of an optical system by a distance from the optical axis.

The occurrence of lens distortion also causes deviation in the image height. As a result, the position of an object captured by the corresponding camera deviates. If the object distance and position are calculated on the basis of this deviated image to generate a two-dimensional map or a surround-view image in which the object is placed, the two-dimensional map or the surround-view image in which the object is placed at a different position from the actual position is generated.

The image height deviation occurs in association with the magnitude of the lens distortion. The lens distortion caused by the temperature change tends to be relatively small in an inner circumferential region of the lens and larger in an outer circumferential region thereof.

As illustrated in FIG. 5(1), an inner circumferential region 51, which is close to a center region of the lens, is a region in which lens distortion due to the temperature change is small.

On the other hand, as illustrated in FIG. 5(1), an outer circumferential region 52 of the lens is a region in which lens distortion due to the temperature change is large.

A line that divides the inner circumferential region 51 and the outer circumferential region 52 is depicted as a region dividing line 61.

FIG. 5(2) is an overhead image generated by correcting the image captured by the camera, which is illustrated in FIG. 5(1). The region dividing line 61 in this overhead image corresponds to the region dividing line 61 dividing the inner circumferential region 51 and the outer circumferential region 52 illustrated in FIG. 5(1).

The region inside the region dividing line 61 corresponds to the inner circumferential region 51 illustrated in FIG. 5(1), that is, an image region captured through a center portion of the lens. As for objects in this region, the positional deviations in the captured image positions are small. This makes it possible to perform position analysis with high accuracy.

On the other hand, the region outside the region dividing line 61 corresponds to the outer circumferential region 52 illustrated in FIG. 5(1), that is, an image region captured through the outer circumferential region of the lens. As for objects in this region, the positional deviations in the captured image positions are large. This makes it difficult to perform position analysis with high accuracy.

That is, objects captured in this outer circumferential region are objects whose reliability of the result of position analysis using the image is low.

There is a correlation between the occurrence of lens distortion due to the temperature change and the amount of image height deviation.

The correlation between the occurrence of lens distortion due to the temperature change and the amount of image height deviation will be described with reference to FIG. 6.

As described earlier, image height is a value that represents an image position on the evaluation surface of the optical system by a distance from the optical axis. For example, values denoted in FIG. 6 are set.

For example, the center of the lens is set to image height=0 (deg) while the outermost circumferential portion is set to image height=200 (deg).

Figure 7:
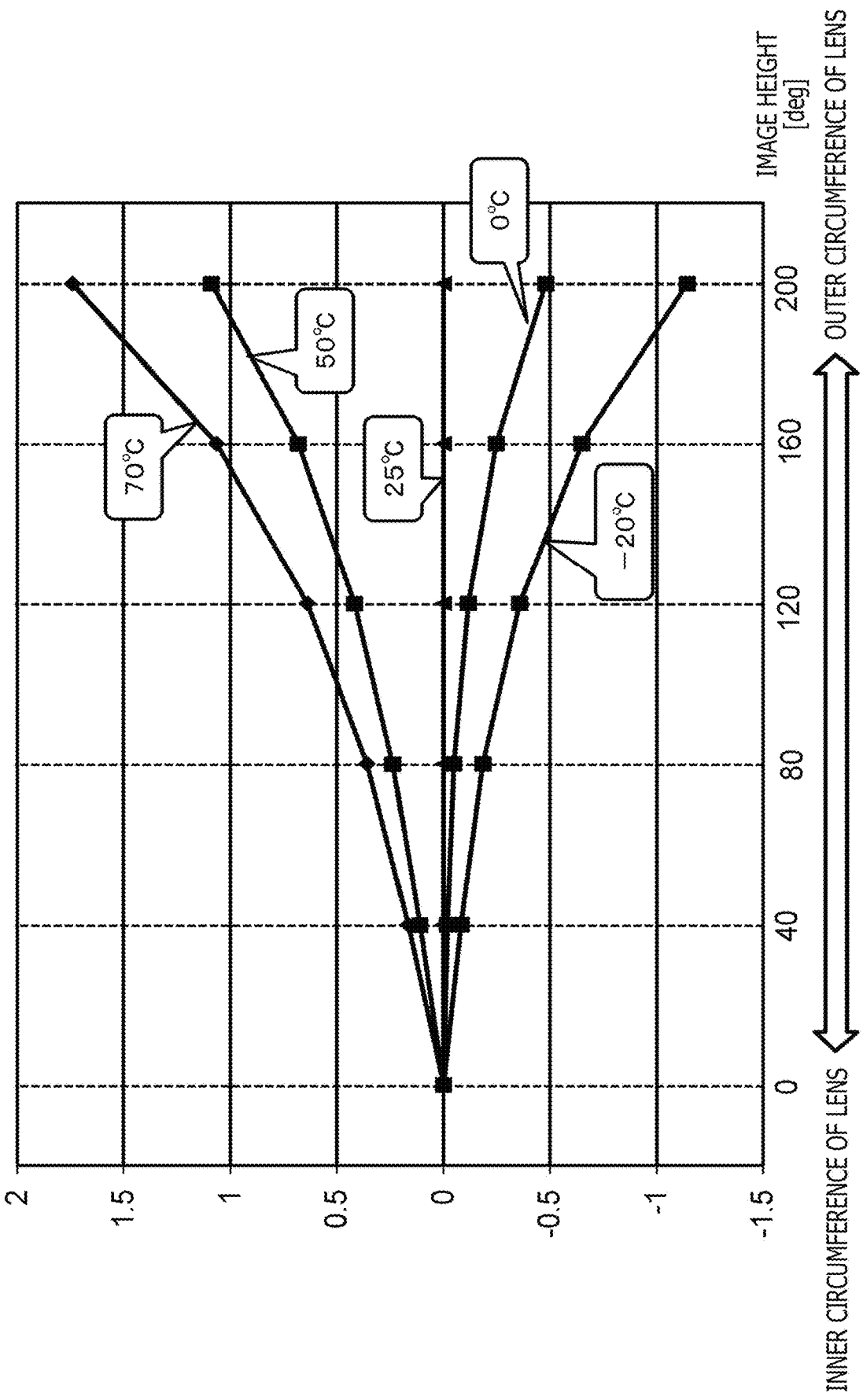
FIG. 7 is a diagram for describing a graph illustrating the state of occurrence of the amount of image height deviation due to the temperature change.

FIG. 7 is a graph illustrating a state of occurrence of the amount of image height deviation due to the temperature change.

Figure 6:
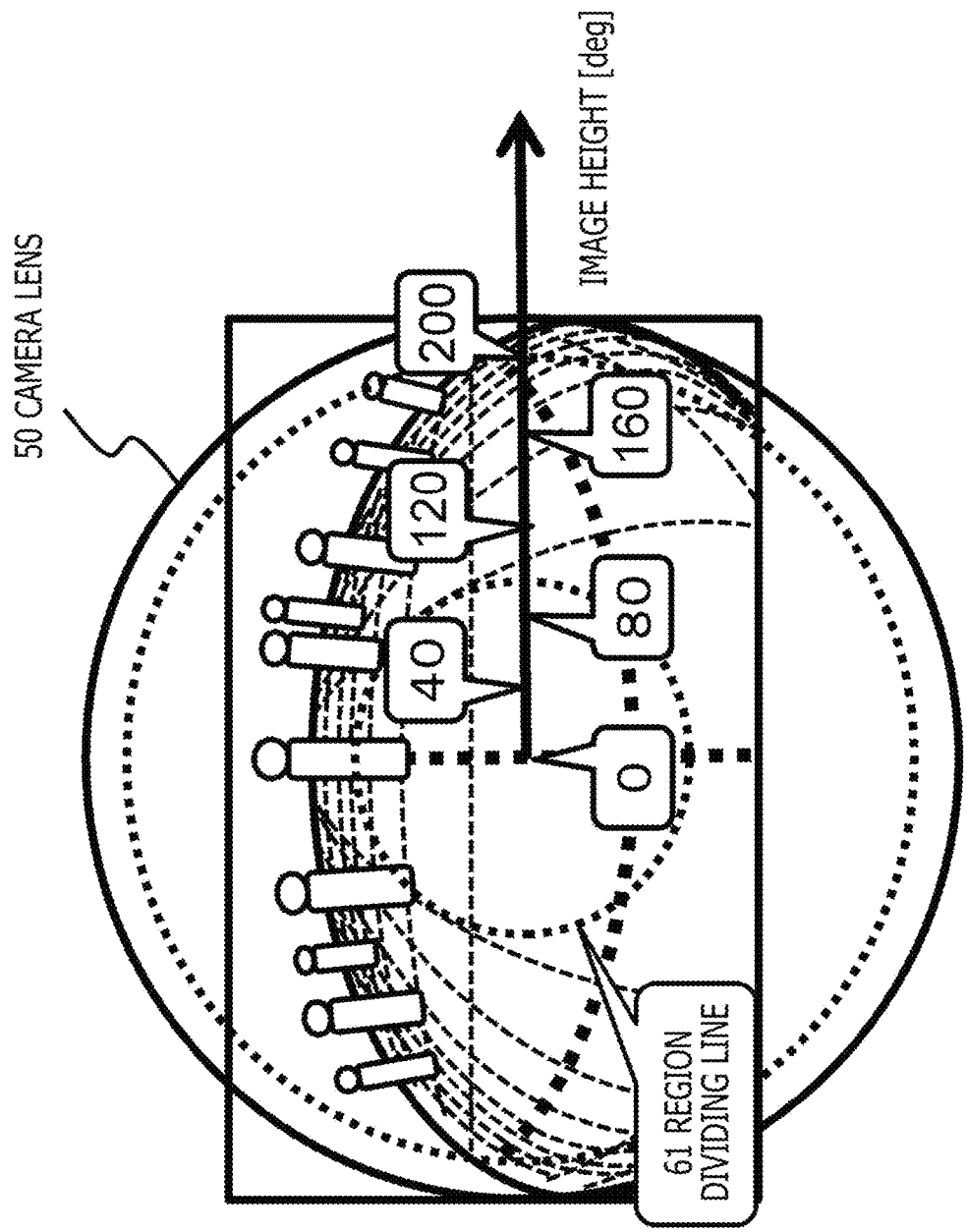
FIG. 6 is a diagram for describing a correlation between the occurrence of lens distortion due to a temperature change and an amount of image height deviation.

The graph illustrated in FIG. 7 is a graph in which the image height (deg) illustrated in FIG. 6 is set on the horizontal axis while the amount of image height deviation (deg) is set on the vertical axis, representing changes in the image height deviation due to the temperature change in the camera (lens).

For example, in a case where the temperature is normal, that is, temperature=25 degrees, lens distortion is small at any of the positions from the inner to outer circumference of the lens, and the amount of image height deviation≈0. The captured image positions of objects in the captured image at this temperature do not deviate, and object positions can be analyzed with high accuracy. Specifically, the objects in an overhead image generated on the basis of the captured image are displayed at correct positions.

However, in a case where, for example, temperature=50 degrees, the amount of image height deviation≈0 in the inner circumferential portion of the lens while lens distortion becomes large and the amount of image height deviation also becomes large in the outer circumferential portion of the lens. For example, the amount of image height deviation≈1 (deg) at the position with the image height=200, that is, approximately at the outer circumferential position of the lens.

Further, for example, in a case where the temperature=70 degrees, the amount of image height deviation≈0 in the inner circumferential portion of the lens while lens distortion becomes even larger and the amount of image height deviation also becomes large in the outer circumferential portion of the lens. For example, the amount of image height deviation≈1.7 (deg) at the position with the image height=200, that is, approximately at the outer circumferential position of the lens.

In this manner, when image height deviation is large, objects in an overhead image generated on the basis of the captured image are displayed at positions deviating from correct positions.

Lens distortion also occurs at low temperatures. For example, in a case where the temperature=0 degrees, the amount of image height deviation≈0 in the inner circumferential portion of the lens while lens distortion becomes large and the amount of image height deviation also becomes large in the outer circumferential portion of the lens. For example, the amount of image height deviation≈−0.5 (deg) at the position with the image height=200, that is, approximately at the outer circumferential position of the lens.

Further, for example, in a case where the temperature=7-20 degrees, the amount of image height deviation≈0 in the inner circumferential portion of the lens while lens distortion becomes even larger and the amount of image height deviation also becomes large in the outer circumferential portion of the lens. For example, the amount of image height deviation≈−1.1 (deg) at the position with the image height=200, that is, approximately at the outer circumferential position of the lens.

It is noted that lens distortion characteristics and image height characteristics due to the temperature change vary depending on the camera configurations and lenses.

For example, the image processing apparatus according to the present disclosure stores pre-measured characteristic information (lens distortion characteristics and image height characteristics due to the temperature change) for the cameras mounted in the vehicle in a storage section and executes the process described below using the characteristic information stored in the storage section.

3. Regarding Sequence of Processing Performed by Image Processing Apparatus According to Present Disclosure Next, a sequence of processing performed by the image processing apparatus according to the present disclosure will be described.

Figure 8:
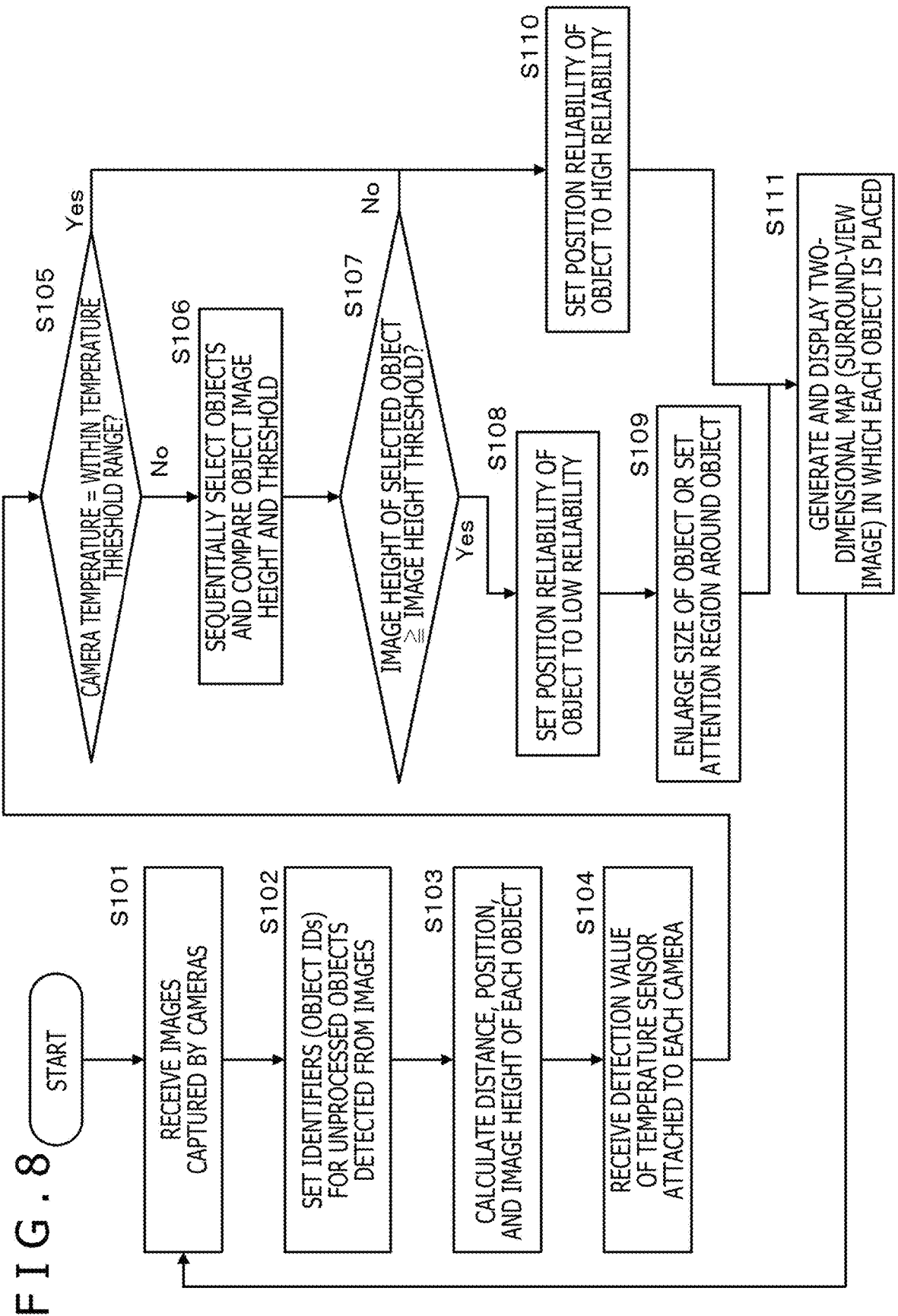
FIG. 8 is a diagram illustrating a flowchart for describing a sequence of processing performed by an image processing apparatus according to the present disclosure.

FIG. 8 is a diagram illustrating a flowchart for describing the sequence of the processing performed by the image processing apparatus according to the present disclosure.

It is noted that the processing according to the flowchart illustrated in FIG. 8 can be performed according to a program stored in the storage section of the image processing apparatus under the control of a data processing section. The data processing section includes a CPU and the like having a program execution function.

A process at each step of the flow illustrated in FIG. 8 will be described in order below.
(Step S101)

First, each imaging section (camera) captures an image in step S101. For example, the cameras 11 to 14 mounted in the vehicle 10 illustrated in FIG. 1 capture images.

It is noted that each imaging section (camera) is a camera including a wide-angle lens such as a fisheye lens and captures the image illustrated in FIG. 4(1) or FIG. 5(1), for example.
(Step S102)

Next, in step S102, an object detection process from the images captured by the imaging sections (cameras) in step S101 is performed to detect objects. Further, the positions of the objects and the sizes of the objects in the images are also detected. The object detection process sets IDs of detected unprocessed objects, that is, unprocessed objects on which the processing according to this flow has not been performed.

An individual ID is set for each object and recorded in the storage section.
(Step S103)

Next, in step S103, the distance and image height of each object are calculated. This process is performed using an existing method.

It is noted that these values are calculated on the basis of the captured images. This means that the calculation process cannot be performed with high accuracy in a region in which image height deviation is large.
(Step S104)

Next, in step S104, temperature information of each camera is obtained from the temperature sensor mounted in each camera that has captured the image.
(Step S105)

Next, in step S105, it is determined whether or not the camera temperature obtained from each temperature sensor is within a predetermined threshold temperature range.

The threshold temperature range is a threshold temperature range set in advance.

For example, the threshold temperature range=10° C. to 30° C. is set. This threshold temperature range is set to a temperature range in which lens distortion is small and the amount of image height deviation is also small.

As described earlier with reference to the graph illustrated in FIG. 7, lens distortion is small and the amount of image height deviation is also small around 25 degrees. This temperature range around 25 degrees is set as the threshold temperature range.

It is noted that the threshold temperature range to be used is preferably set to an optimum range corresponding to the characteristic of the camera and lens to be used.

In a case where the determination is Yes in step S105, that is, it is determined that the camera temperature obtained from each temperature sensor is within the predetermined threshold temperature range, the processing proceeds to step S110.

This is a case where the cameras or lenses are in a normal temperature state and it is determined that the lens distortion is small and no large image height deviation occurs even in the outer circumferences of the lenses.

On the other hand, in a case where the determination is No in step S105, that is, it is determined that the camera temperature obtained from each temperature sensor is not within the predetermined threshold temperature range (between a predetermined first threshold and a predetermined second threshold), the processing proceeds to step S106.

This is a case where the cameras or lenses are in the high temperature state in which the temperature is higher than the predetermined first threshold, or a case where the cameras or lenses are in the low temperature state in which the temperature is lower than the predetermined second threshold. Thus, this is a case where there is a possibility that lens distortion is large and large image height deviation occurs in the outer circumferences of the lenses. The first threshold is greater than the second threshold. However, the first threshold and the second threshold may be set to the same value.
(Step S106)

In a case where the determination in step S105 is No, that is, the camera temperature obtained from each temperature sensor is not within the predetermined threshold temperature range, the processing proceeds to step S106.

As described earlier, this is a case where the cameras or lenses are in the high or low temperature state and there is a possibility that lens distortion is large and large image height deviation occurs in the outer circumferences of the lenses.

In this case, in step S106, the objects (unprocessed objects) in each image are sequentially selected and a process of comparing the object image height and a predetermined image height threshold is performed.

It is noted that the processes of steps S106 to S110 are repeated sequentially or performed in parallel for the objects (unprocessed objects) in each image.

For example, it suffices that the image height threshold is set as the image height corresponding to the region dividing line 61 illustrated in FIGS. 5 and 6.

That is, the image height corresponding to the region dividing line 61 is set as the image height threshold. The region dividing line 61 is the boundary between the inner circumferential region 51 and the outer circumferential region 52 illustrated in FIG. 5. In the inner circumferential region 51, lens distortion and image height deviation due to the temperature change are small. In the outer circumferential region 52, lens distortion and image height deviation due to the temperature change are large.

For example, in the example illustrated in FIG. 6, image height threshold≈90 (deg) is set.

It is noted that this image height threshold, that is, the image height corresponding to the region dividing line 61, which is the boundary between the inner circumferential region 51 and the outer circumferential region 52, varies depending on the cameras and lenses. The image processing apparatus obtains the image height threshold corresponding to each camera and lens mounted in the vehicle and stores the image height threshold in the storage section in advance. The image processing apparatus uses this stored data to perform the process of step S106.
(Step S107)

Next, in step S107, the image processing apparatus determines whether or not the image height of the object selected from the corresponding image is equal to or greater than the predetermined image height threshold.

In a case where the image height of the selected object is equal to or greater than the predetermined image height threshold, the processing proceeds to step S108.

This is a process for a case where the selected object is an object outside the region dividing line 61.

On the other hand, in a case where the image height of the object is not equal to or greater than the predetermined image height threshold, the processing proceeds to step S110.

This is a process for a case where the selected object is an object inside the region dividing line 61.

(Step S108)

In a case where it is determined in step S107 that the image height of the selected object is equal to or greater than the predetermined image height threshold, that is, in a case where the selected object is an object outside the region dividing line 61, the processing proceeds to step S108.

In this case, the image processing apparatus sets the position reliability, which is attribute information of the selected object, to low reliability in step S108.

This attribute information with the position reliability set to low reliability is recorded in the storage section in association with the corresponding object ID.

(Step S109)

Next, in step S109, the image processing apparatus performs a process of enlarging the size of the object whose position reliability is set to low reliability or a process of setting a region around the object as an attention region. This region has a width/size corresponding to the reliability.

Figure 9:
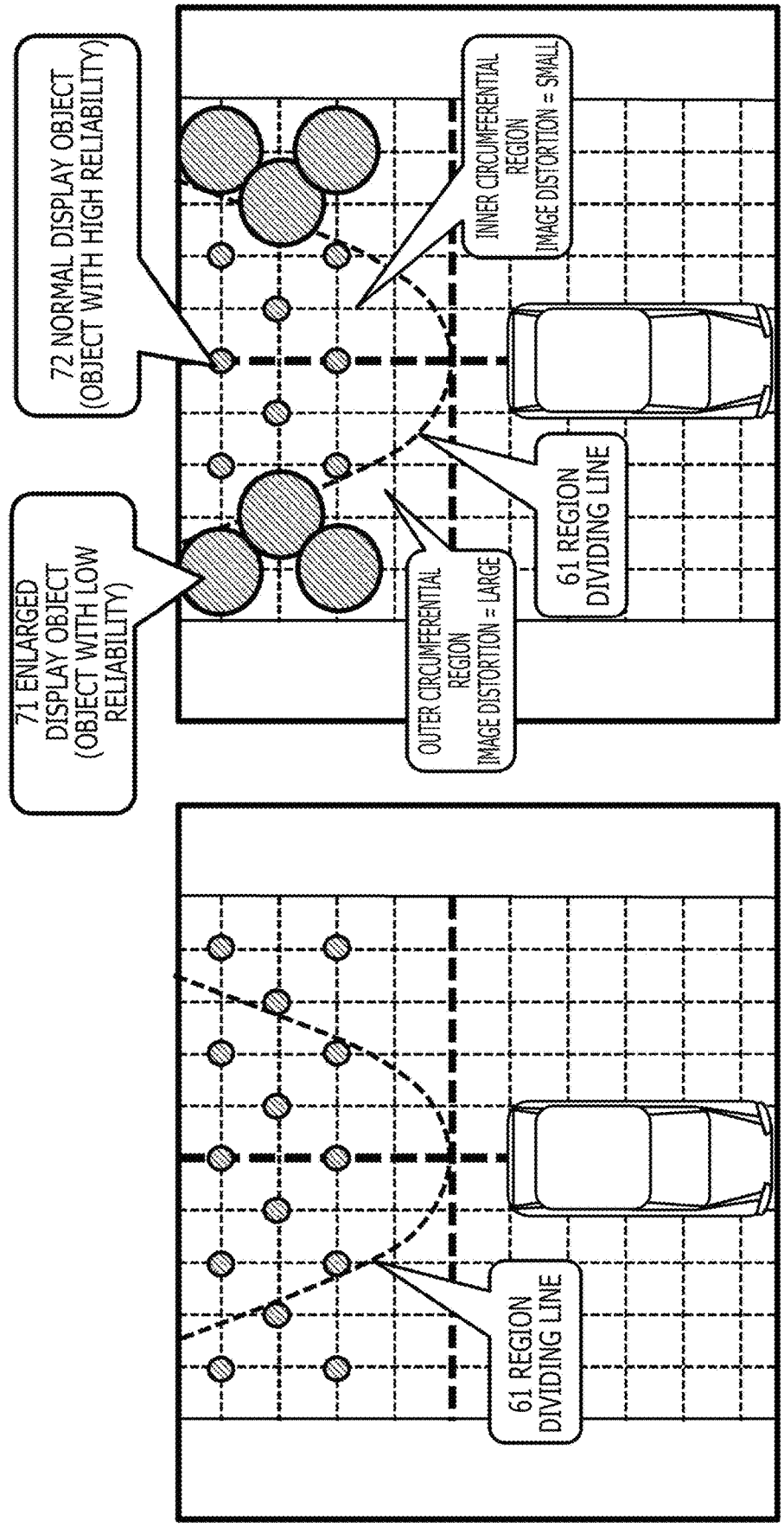
FIG. 9 depicts diagrams for describing a specific example of a two-dimensional map (/surround-view image) according to the present disclosure.
Figure 10:
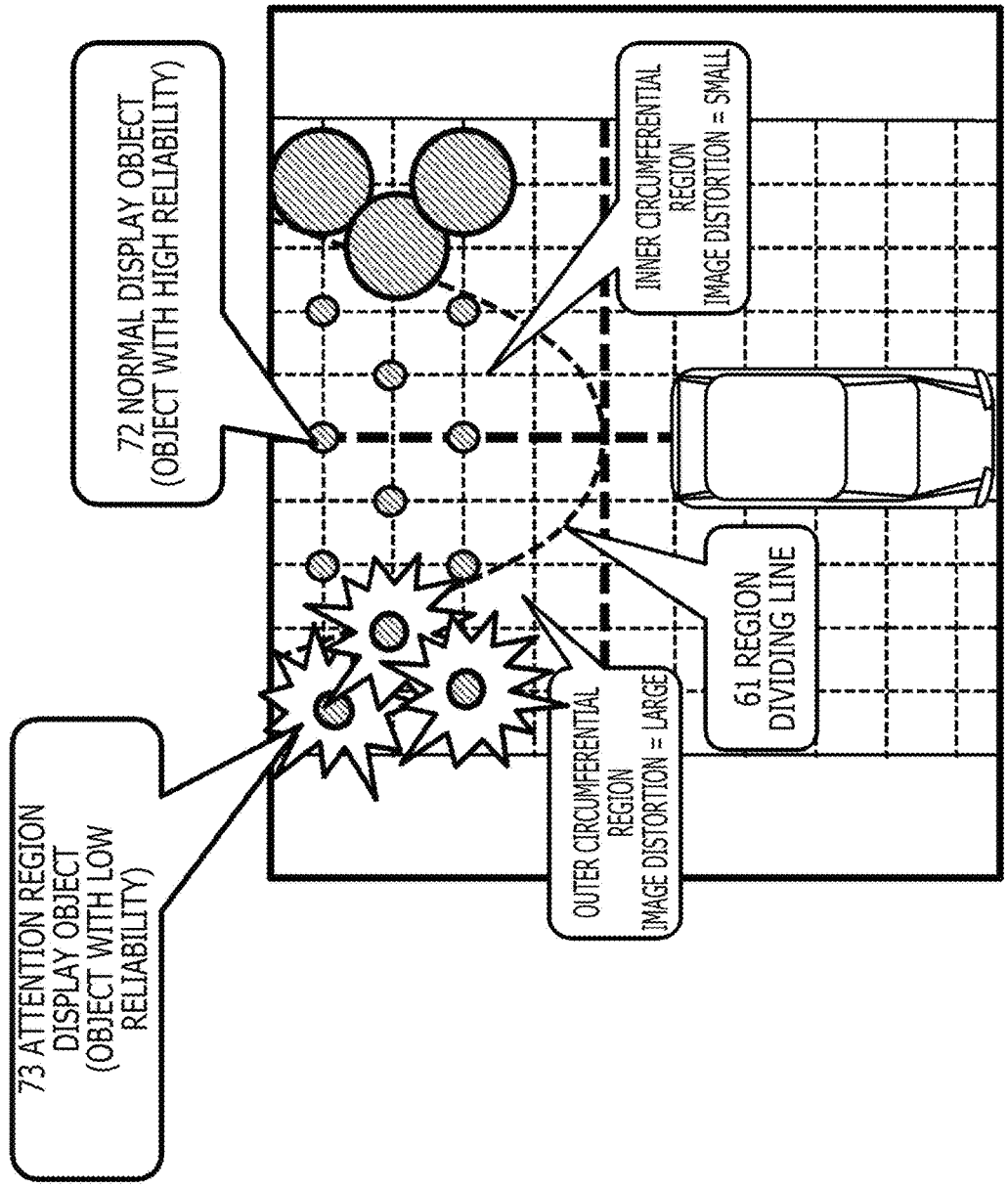
FIG. 10 is a diagram for describing a specific example of the two-dimensional map (/surround-view image) according to the present disclosure.

This is specifically a process of generating display data for an enlarged display object 71 illustrated in FIG. 9(2) or an attention region display object 73 illustrated in FIG. 10(3).

This display data will be described in detail later.

(Step S110)

On the other hand, in a case where it is determined in step S107 that the image height of the selected object is not equal to or greater than the predetermined image height threshold, that is, in a case where the selected object is an object inside the region dividing line 61, the processing proceeds to step S110.

Further, also in a case where the determination is Yes in step S105, that is, it is determined that the camera temperature obtained from the corresponding temperature sensor is within the predetermined threshold temperature range, the processing also proceeds to step S110. This is a case where the camera and the lens are in the normal temperature state and it is determined that the lens distortion is small and no large image height deviation occurs even in the outer circumference of the lens.

In these cases, the image processing apparatus sets the position reliability, which is the attribute information of the selected object, to high reliability in step S110.

This attribute information with the position reliability set to high reliability is recorded in the storage section in association with the corresponding object ID.

The position reliability information is set for all the objects by the processes of steps S108 and S110.

(Step S111)

Finally, in step S111, the image processing apparatus generates and displays a two-dimensional map (/surround-view image) in which each object is placed.

For example, the two-dimensional map (/surround-view image) is displayed on the monitor at the driver's seat.

It is noted that after the process of step S111, the processing returns to step S101 and repeats the processes.

An example of the display image generated in step S111 will be described with reference to FIG. 9.

The following two image display examples are illustrated in FIG. 9.

(1) A conventional two-dimensional map (/surround-view image)

(2) A two-dimensional map (/surround-view image) according to the present disclosure (1) The conventional two-dimensional map (/surround-view image) is displayed as an image in which all the poles behind the vehicle reflect their actual sizes.

It is noted that the region dividing line 61 depicted in the image is not display data but a line depicted for reference.

The region dividing line 61 corresponds to the region dividing line 61 described earlier with reference to FIG. 5. That is, the region dividing line 61 is a line corresponding to the region dividing line 61 that divides the inner circumferential region 51 and the outer circumferential region 52 described with reference to FIG. 5.

The inside of the region dividing line 61 corresponds to the image region captured through the center portion of the lens. As for the objects in this region, the positional deviations in the captured image positions are small. This makes it possible to perform position analysis with high accuracy.

On the other hand, the outside of the region dividing line 61 corresponds to the image region captured through the outer circumferential region of the lens. As for the objects in this region, the positional deviations in the captured image positions are large. This makes it difficult to perform position analysis with high accuracy.

That is, the objects in this outer circumferential region are objects with low reliability that cannot be surely said to be present in the display positions in the overhead image illustrated in FIG. 9(1).

In a case where such an object with low position reliability is displayed as it is and the driver drives the vehicle while viewing this display image, there is a risk that the driver believes that the driver is driving with a sufficient distance from the object (pole) so as not to contact the object (pole) on the basis of the display image, but the vehicle actually contacts the object (pole) or passes so close to the object (pole) that the vehicle almost contacts the object (pole).

The display image for avoiding such a risk is (2) the two-dimensional map (/surround-view image) according to the present disclosure illustrated in FIG. 9(2).

This image is generated according to the flow illustrated in FIG. 8.

In the image illustrated in FIG. 9(2), the objects (poles) in the inner region of the region dividing line 61, that is, the inner region corresponding to the image region captured through the center portion of the lens, are normal display objects 72 on which a similar display process to that of the conventional image illustrated in (1) has been performed. The normal display objects 72 are displayed as images that reflect the actual object sizes.

These normal display objects 72 are objects on which the process of step S110 of the flow illustrated in FIG. 8 has been performed.

That is, the normal display objects 72 are objects whose object position reliability has been set to high reliability in step S110.

The objects subjected to the process of step S110, that is, the objects with the position reliability set to high reliability are objects determined in step S107 that the image heights of the selected objects are not equal to or greater than the predetermined image height threshold. That is, these are objects inside the region dividing line 61. As for these objects, the objects included in the overhead image are displayed as they are.

On the other hand, in the image illustrated in FIG. 9(2), the objects (poles) in the outer region of the region dividing line 61, that is, the outer region corresponding to the image region captured through the outer circumferential portion of the lens, are not displayed in the actual sizes of the objects included in the overhead image, but are displayed as enlarged display objects 71, which are obtained by enlarging the sizes of the objects obtained from the captured image.

These objects are objects on which the processes of steps S108 to S109 of the flow illustrated in FIG. 8 have been performed.

That is, these are objects whose object position reliability has been set to low reliability in step S108 and on which the process of enlarging the sizes of the objects has been performed in step S109.

The objects on which the processes of steps S108 to S109 have been performed, that is, the objects whose position reliability has been set to low reliability and on which the enlargement process has been performed, are objects determined in step S107 that the image heights of the selected objects are equal to or greater than the predetermined image height threshold. That is, these are objects outside the region dividing line 61. These objects are not displayed in the sizes of the objects obtained from the captured image as they are, but are displayed in the enlarged state.

In this manner, as for objects with low position reliability, images displayed in the enlarged state are displayed on the monitor at the driver's seat. The driver moves the vehicle such that the vehicle does not contact the objects (poles) displayed in the enlarged state. As a result, even in a case where the actual object positions deviate from the positions of the objects (poles) that are not enlarged in the overhead image, the driver can safely move the vehicle without causing the vehicle to contact the actual objects (poles).

It is noted that in a case where the determination is Yes in step S105, that is, the camera temperature is within the temperature threshold range in the flow illustrated in FIG. 8, the objects in the outer circumferential region are not displayed in the enlarged state and images similar to those of the conventional images illustrated in FIG. 9(1) are displayed.

This is because, in this case, image height deviation less occurs with the objects in the outer circumferential region and these objects can be displayed at the correct positions.

It is noted that the display mode of the objects with low reliability is not limited to the enlarged display illustrated in FIG. 9(2). For example, an attention region is displayed in a superimposed manner so as to surround the corresponding object, as illustrated in FIG. 10. In this manner, various displays are possible.

Further, objects to be displayed in the enlarged state or the like are objects whose position reliability has been determined to be low reliability. However, the region dividing line 61 illustrated in FIGS. 9 and 10 moves as the vehicle travels.

Therefore, even if the vehicle travels later and the objects (whose position reliability is high reliability) detected in the inner region of the region dividing line 61 in a past captured image are placed outside the region dividing line 61 accordingly, their position reliability set as high reliability can be maintained. For such objects, the enlarged display, attention display, or the like is not necessarily performed.

A specific example will be described with reference to FIG. 11.

Figure 11:
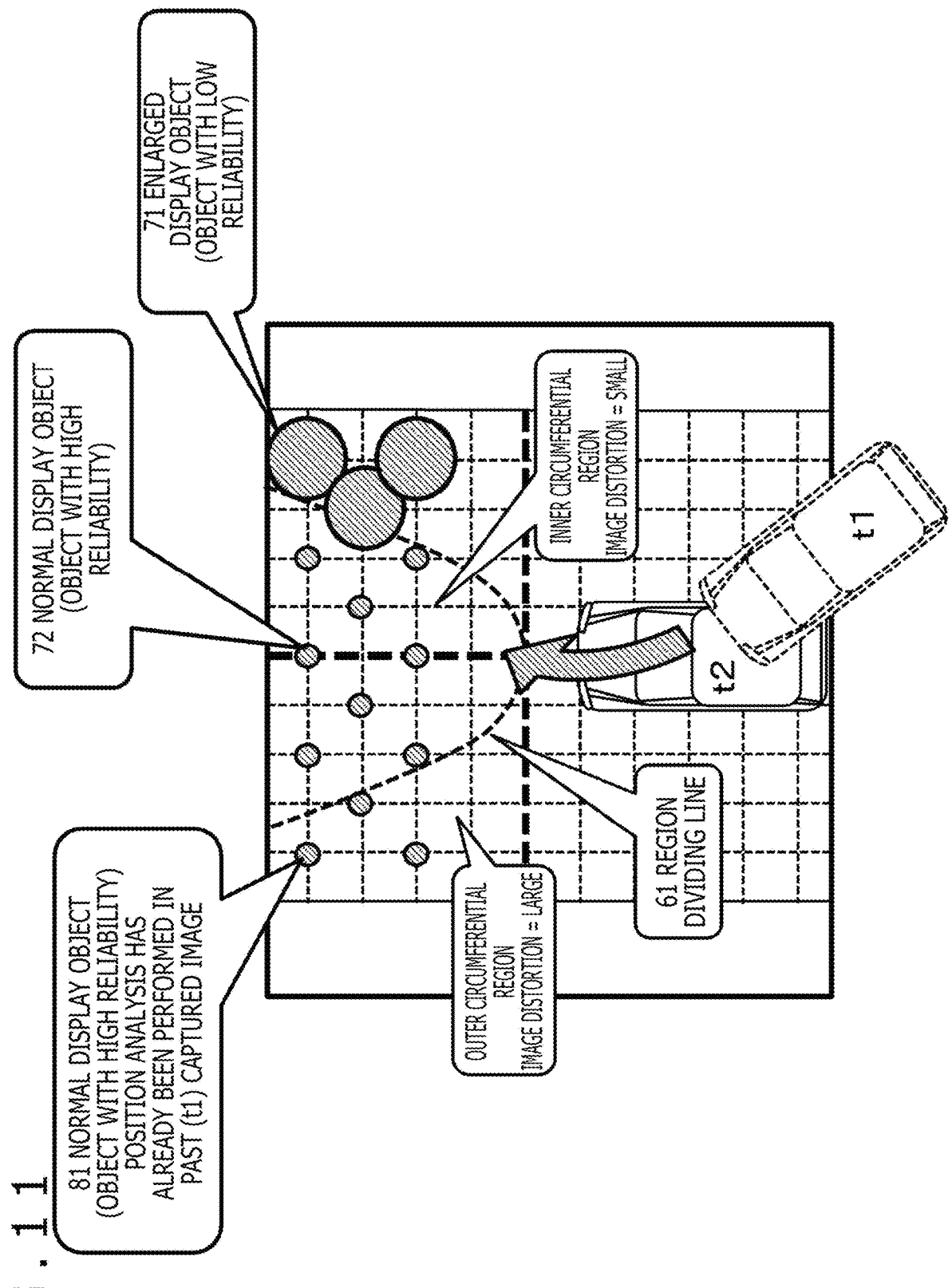
FIG. 11 is a diagram for describing a specific example of the two-dimensional map (/surround-view image) according to the present disclosure.

FIG. 11 illustrates a state in which the vehicle gently curves to the right and moves forward. The vehicle sharply curves to the right from time t1 to t2.

At time t2, normal display objects 81 illustrated in FIG. 11 are in the outer circumferential region outside the region dividing line 61 (t2). These normal display objects 81 are present approximately in the front direction of the vehicle at time t1.

Therefore, this means that the normal display objects 81 were present in the inner region of the region dividing line 61 (t1) of the image captured by the front camera of the vehicle at time t1. At this point, the process of step S110 of the flow illustrated in FIG. 8 has already been performed and the objects have been registered in the storage section as the objects whose position reliability has been determined as high reliability.

Even if the vehicle travels later and such objects, that is, objects whose position reliability has been determined as high reliability, are located in the outer circumferential region outside the region dividing line 61 accordingly, these objects are regarded as objects whose position analysis has been performed and are not displayed in the enlarged state. That is, the processes of steps S108 to S109 are not performed.

4. Regarding Example of Processing for Using Two-Dimensional Map for Automated Driving Next, an example of processing for using a two-dimensional map for automated driving will be described.

In the flow illustrated in FIG. 8 described earlier, in the final step S111, the processes of generating and displaying the two-dimensional map (/surround-view image) in which each object is placed are performed.

That is, this is a processing sequence for generating the display image for displaying the two-dimensional map (/surround-view image) on the monitor at the driver's seat and allowing the driver to drive in such a manner that the vehicle does not contact an object by viewing the two-dimensional map (/surround-view image), for example.

The two-dimensional map generated by the processes of steps S101 to S110 of the flow illustrated in FIG. 8 can be used not only in this manner for driving by the driver but also as data for automated driving.

Figure 12:
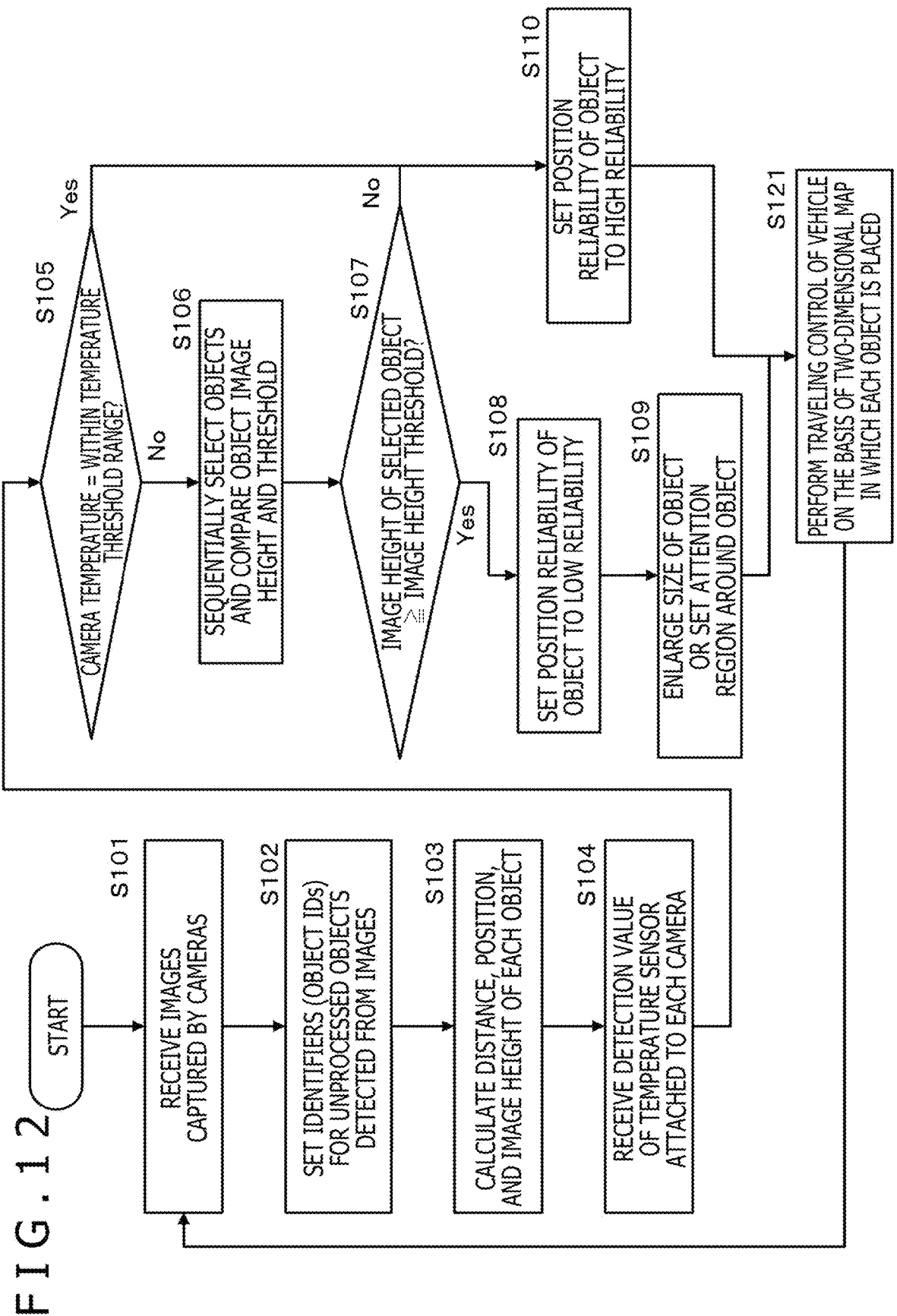
FIG. 12 is a diagram illustrating a flowchart for describing a sequence of processing performed by the image processing apparatus according to the present disclosure.

A flowchart illustrated in FIG. 12 is a flowchart for describing the processing sequence for using the two-dimensional map for automated driving.

The flow illustrated in FIG. 12 will be described.

The processes of steps S101 to S110 in the flow illustrated in FIG. 12 are the same as the processes of steps S101 to S110 in the flow described earlier with reference to FIG. 8. Only the final step S121 is different therefrom.

That is, the flow illustrated in FIG. 12 is a flow in which step S111 in the flow illustrated in FIG. 8 is replaced by step S121 illustrated in FIG. 12.

The process of step S121 will be described.
(Step S121)

In step S121, the traveling control of the vehicle is performed on the basis of the two-dimensional map (for traveling control) in which each object is placed. The traveling control of the vehicle includes traveling through automated driving. The automated driving control data such as the high-definition map may be used as the traveling control data. In this case, the automated driving control data such as the high-definition map includes information regarding the position, size, and distance of each object in the three-dimensional space and information regarding the attention region set on the basis of reliability.

The two-dimensional map for traveling control used at this time is the two-dimensional map as described with reference to FIGS. 9(2), 10, and 11.

That is, as for objects whose position reliability is low reliability, their sizes are enlarged or regions each having a width/size corresponding to reliability are set around the respective objects as attention regions. The two-dimensional map is a two-dimensional map based on such objects.

A vehicle control section, which performs automated traveling of the vehicle, uses the two-dimensional map for traveling control to select a route on which the vehicle does not contact the enlarged objects or the objects and the attention regions and perform control to travel the route.

As a result, even if positional deviations of objects whose position reliability is low reliability occur, the vehicle control section performs control to travel a route on which the vehicle does not enter the enlarged object display regions. As a result, since the traveling route that greatly reduces the possibility of contacting the objects whose position reliability is low reliability is selected, safe automated traveling can be realized.

5. Regarding Other Embodiments

Next, other embodiments will be described.

The object display examples described earlier with reference to FIGS. 9(2) and 10 are configured such that the region dividing line 61 serves as a boundary along which object display modes, that is, two types of display mode, normal display or enlarged display, are switched.

That is, objects located in the inner circumferential region inside the region dividing line 61 are determined to be objects whose position reliability is high reliability, while objects located in the outer circumferential region outside the region dividing line 61 are determined to be objects whose position reliability is low reliability. The objects which are located in the inner circumferential region and whose position reliability is high reliability are configured to be displayed so as to reflect the actual object sizes, while the objects which are located in the outer circumferential region and whose position reliability is low reliability are configured to be displayed in the enlarged state enlarged from the actual object sizes or displayed with attention regions.

Other display modes are also possible as the display mode of objects whose position reliability is low reliability.

Figure 13:
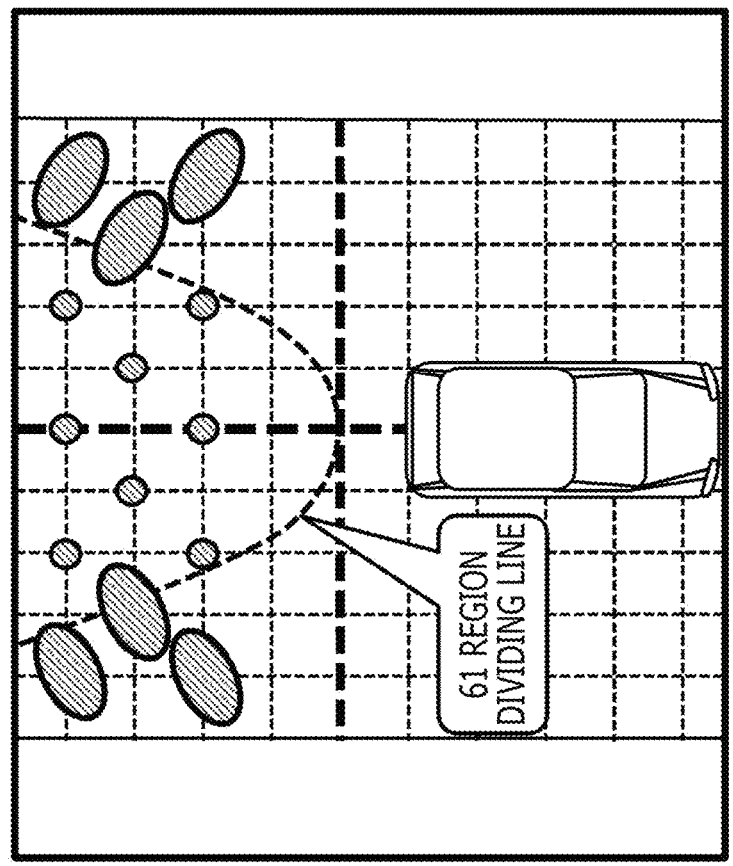
FIG. 13 is a diagram for describing a specific example of the two-dimensional map (/surround-view image) according to the present disclosure.

For example, if the directions of positional deviations are determined according to the temperature characteristic of the lens, objects may be configured to be displayed such that the objects are enlarged only in the respective deviation directions, as illustrated in FIG. 13.

For example, the temperature characteristic of the lens at high temperatures tends to exhibit a change that spreads radially around the lens optical axis. In a case where the direction in which the subject imaging position deviates due to the temperature characteristic is known in advance, the object may be displayed so as to be enlarged only in the corresponding deviation direction, as illustrated in FIG. 13.

Figure 14:
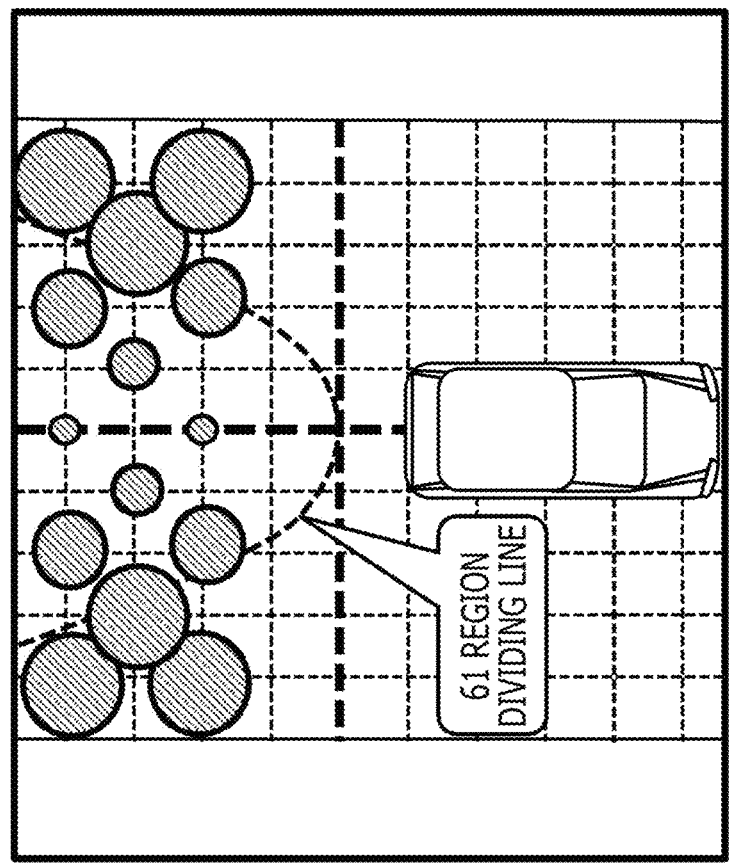
FIG. 14 is a diagram for describing a specific example of the two-dimensional map (/surround-view image) according to the present disclosure.

Moreover, instead of two display types of normal display and enlarged display, objects may be set to be displayed such that the enlargement ratios are set to be sequentially changed, as illustrated in FIG. 14, for example.

That is, processes of changing the enlargement ratios according to the values of position reliability and performing display are performed.

Since position reliability is high in a captured image region close to the center of the lens, normal display is performed. That is, objects are displayed in sizes that reflect their actual sizes as they are.

As described earlier with reference to FIG. 7, the amount of image height deviation gradually increases as the distance from the center of the lens increases.

The display image (two-dimensional map (/surround-view image)) illustrated in FIG. 14 is an example in which objects are displayed in such a manner that the enlargement ratio of each object varies depending on the amount of image height deviation.

In this manner, objects may be configured to be displayed in such a manner that the enlargement ratio of each object varies depending on the amount of image height deviation, that is, a change in the position reliability.

Alternatively, for example, the objects may be each configured to be displayed in a color that varies depending on the position reliability. For example, the display mode is as follows:

an object whose position reliability is high reliability is displayed in green;

an object whose position reliability is medium reliability is displayed in yellow; and an object whose position reliability is low reliability is displayed in red.

Further, a frame having a size that varies depending on the position reliability may be configured to be displayed outside the shape of each of the actual objects.

An object whose position reliability is high reliability is displayed in a small frame.

An object whose position reliability is medium reliability is displayed in an approximately medium-sized frame.

An object whose position reliability is low reliability is displayed in a large frame.

For example, the display mode is as above.

It is noted that the display data may be generated by combining any of the plurality of display modes described above.

6. Regarding Example of Configuration of Image Processing System (Vehicle Control System)

Next, an example of a configuration of an image processing system (vehicle control system) 100 according to the present disclosure, which performs the above-described processing, will be described with reference to FIG. 15.

According to the flow described earlier with reference to FIG. 8, the image processing apparatus 100 according to the present disclosure performs the processes of generating a two-dimensional map in which image processing such as enlargement is performed on objects with low position reliability and displaying the two-dimensional map as a two-dimensional map (/surround-view image) for display on the display section.

Moreover, the image processing apparatus that generates such a two-dimensional map is used as a constituent component of the vehicle control system 100.

Figure 15:
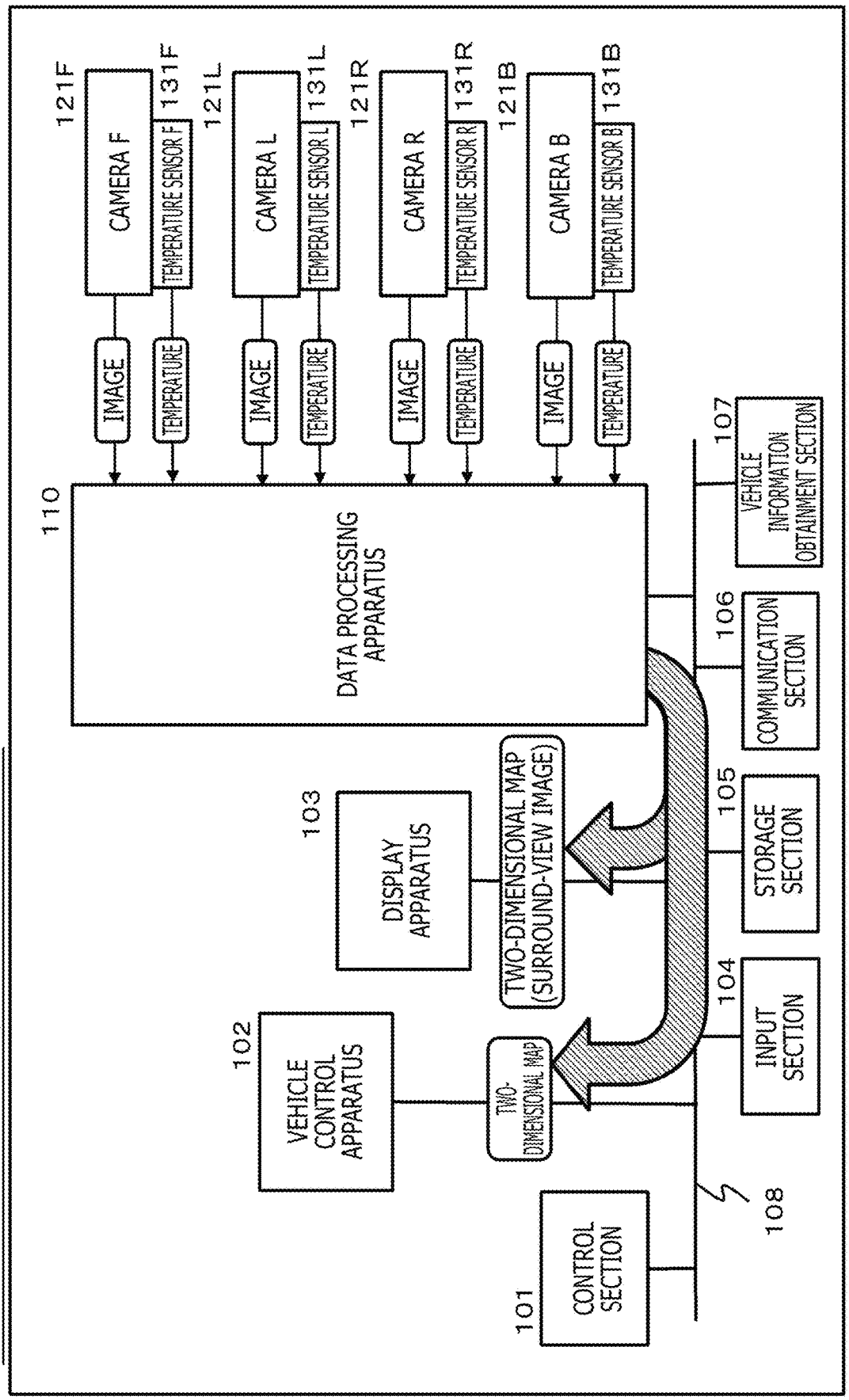
FIG. 15 is a diagram for describing an example of a configuration of an image processing system (vehicle control system) according to the present disclosure.

FIG. 15 is a block diagram illustrating the example of the configuration of the image processing system (vehicle control system) 100 having both of functions of the image processing apparatus and a vehicle control apparatus.

As with the vehicle 10 described with reference to FIG. 1, the image processing system (vehicle control system) 100 illustrated in FIG. 15 includes four cameras, each of which captures an image in the corresponding one of the front, rear, left, and right directions of the vehicle, that is, a surround-view camera system.

The image processing system (vehicle control system) 100 illustrated in FIG. 15 is an apparatus that is disposed inside the vehicle, for example. As illustrated in the figure, the image processing system (vehicle control system) 100 includes a control section 101, a vehicle control apparatus 102, a display apparatus 103, an input section 104, a storage section 105, a communication section 106, a vehicle information obtainment section 107, a data processing apparatus 110 and, moreover, four cameras 121F to 121B and temperature sensors 131F to B. The four cameras 121F to 121B are mounted on the front, rear, left, and right sides of the vehicle. The temperature sensors 131F to B are mounted in the respective cameras.

It is noted that components such as the display apparatus 103, the data processing apparatus 110, and the four cameras 121F to 121B can be individually configured as individual apparatuses with separate and independent housings.

As with the vehicle 10 described with reference to FIG. 1, the four cameras 121F to 121B are four cameras, each of which captures an image in the corresponding one of the front, rear, left, and right directions of the vehicle and is used to generate a surround-view image. The camera F, 121F is a camera that captures an image in the front direction. The camera L, 121L is a camera that captures an image in the left direction. The camera R, 121R is a camera that captures an image in the right direction. The camera B, 121B is a camera that captures an image in the rear direction.

Each of these cameras has a wide-angle lens such as a fisheye lens, for example, and can capture an image of a wider region, that is, a wide-angle area.

Each of these cameras 121F to 121B individually includes the corresponding one of the temperature sensors 131F to B.

The data processing apparatus 110 receives the images captured by these four cameras to generate a two-dimensional map as described earlier with reference to FIG. 1 or an image (surround-view image) from a viewpoint above the vehicle, which represents the vehicle and the surroundings of the vehicle, and then display the two-dimensional map or the image (surround-view image) on the display apparatus 103. Further, in a case where the two-dimensional map is used as traveling control data, the two-dimensional map is provided to the vehicle control apparatus 102.

It is noted that the two-dimensional map (/surround-view image) to be generated by the data processing apparatus 110 is the two-dimensional map generated by the processing according to the flowchart illustrated in FIG. 8 or FIG. 12 described earlier.

That is, in a case where the temperature detected by the temperature sensor attached to each camera is not within the predetermined temperature range, objects in the outer circumferential portion of each lens, that is, objects whose position reliability is low reliability, are displayed in the enlarged state or displayed so as to call attention.

Specifically, for example, the two-dimensional map (/surround-view image) described earlier with reference to FIGS. 9(2), 10, 11, 13, and 14 is generated.

The display apparatus 103 is a display section including a display, such as, for example, a liquid crystal display apparatus, disposed at a position where the driver in the driver's seat can observe the display.

The two-dimensional map (/surround-view image) generated by the data processing apparatus 110 is displayed on this display apparatus 103.

For example, an enlarged image of an object with low position reliability is displayed on the monitor at the driver's seat. The driver moves the vehicle such that the vehicle does not contact the object (pole) displayed in the enlarged state. As a result, even in a case where the actual object position deviates from the position of the object (pole) that is not enlarged in the overhead image, the driver can safely move the vehicle without causing the vehicle to contact the actual object (pole).

Moreover, the two-dimensional map (/surround-view image) generated by the data processing apparatus 110 is also input into the vehicle control apparatus 102.

The vehicle control apparatus 102 performs automated driving control of the vehicle, such as steering operations and acceleration/deceleration of the vehicle.

The vehicle control apparatus 102 determines a traveling route by referring to the two-dimensional map generated by the data processing apparatus 110, that is, the two-dimensional map, in which, for example, objects with low position reliability are enlarged or attention regions are set, as a two-dimensional map for control, and causes the vehicle to automatically travel the traveling route.

Using the two-dimensional map, the vehicle control apparatus 102 selects a route on which the vehicle does not contact the enlarged objects or attention regions set as the objects in the two-dimensional map and performs control to travel the route.

As a result, even if positional deviations of objects whose position reliability is low reliability occur, the vehicle control section performs control to travel a route on which the vehicle does not enter the enlarged object display regions. As a result, since the traveling route that greatly reduces the possibility of contacting the objects whose position reliability is low reliability is selected, safe automated traveling can be realized.

The input section 104 includes a switch or an operation section that can be operated by a user, for example. It is noted that a touch panel or the like that is a UI (user interface) screen displayed on the display apparatus 103 also functions as the input section 104.

The storage section 105 is data storage means including various configurations such as a removable medium, a RAM, and a ROM in addition to a mass storage apparatus such as a hard disk, for example.

The communication section 106 communicates with external apparatuses such as a server and a user terminal such as a user's smartphone by applying at least any of various communication means, such as Wi-Fi® 4G®, LTE®, and Bluetooth®, for example.

The vehicle information obtainment section 107 obtains operation information of the operation section operated by the driver at the time of the traveling of the vehicle. Examples of the operation section include a steering wheel, an accelerator, a brake, and the like. Moreover, the vehicle information obtainment section 107 may be configured to obtain detection information of sensors and the like.

The control section 101 controls various processes performed in the image processing system (vehicle control system) 100. It is noted that the control section 101 includes a data processing section having a program execution function, such as a CPU, for example, and controls various processes performed in the image processing system (vehicle control system) 100 according to a program stored in the storage section 105, for example.

It is noted that each apparatus and each configuration section illustrated in FIG. 15 may be configured as a single apparatus or configuration section including a plurality of apparatuses or configuration sections. Further, each apparatus and each configuration section illustrated in FIG. 15 are configured in a mobile object such as a vehicle.

An example of a detailed configuration of the data processing apparatus 110 is illustrated in FIG. 16.

As illustrated in FIG. 16, the data processing apparatus 110 includes an object recognition section 201, an object distance calculation section 202, a reliability calculation section 203, a display data creation section 204, and a traveling control data creation section 205.

The object recognition section 201 performs object detection from the image captured by each imaging section (camera) and generates position information (coordinates on the image) of each object and size information of each object as recognition results.

The object distance calculation section 202 calculates the distance to each detected object from the corresponding imaging section (camera) or the host vehicle in which the imaging sections are mounted.

The reliability calculation section 203 obtains the camera temperature from each temperature sensor and information (position and distance) regarding each object from the object distance calculation section. In addition, the reliability calculation section 203 may obtain the size information of each object. According to the result of comparison between the camera temperature and the predetermined threshold, the reliability calculation section 203 calculates the reliability of the information (position, distance, size, and the like) regarding each object calculated by the object distance calculation section 202.

The display data creation section 204 creates display data on the basis of each object position information (coordinates on the image) generated by the object recognition section 201, the distance of each of the detected objects generated by the object distance calculation section 202, and the reliability of the information (position, distance, size, and the like) regarding each object generated by the reliability calculation section 203. The display data may be a two-dimensional map that not only depicts the position, distance, and size of each object but also has information regarding each attention region set on the basis of the reliability.

Further, the display data may also be image data after the enlargement process, in which object regions in the shot images are enlarged on the basis of the information (position, distance, and size) regarding each object and the reliability. Further, the display data may also be a two-dimensional map superimposed on the shot images. Further, the display data may be image data generated by superimposing marks on the shot images. Each of these marks indicates information (position, distance, size, and the like) regarding the corresponding object modified on the basis of the reliability.

The traveling control data creation section 205 obtains each object position information (coordinates on the image) generated by the object recognition section 201, the distance of each of the detected objects generated by the object distance calculation section 202, and the reliability of the information (position, distance, size, and the like) regarding each object generated by the reliability calculation section 203. The traveling control data creation section 205 creates traveling control data on the basis of each object position information (coordinates on the image) generated by the object recognition section 201, the distance of each of the detected objects generated by the object distance calculation section 202, and the reliability of the information (position, distance, size, and the like) regarding each object generated by the reliability calculation section 203. The traveling control data may be a two-dimensional map that not only depicts the position, distance, and size of each object but also has information regarding each attention region based on the reliability. Further, the traveling control data may also be a high-definition map, which is information in the three-dimensional space. The high-definition map includes information regarding the position, size, and distance of each object in the three-dimensional space and information regarding each attention region set on the basis of the reliability. The traveling control data may be automated driving control data of a different type from the high-definition map.

Further, the traveling control data creation section 205 may use captured images shot by the cameras when creating the traveling control data (including the high-definition map). Further, the traveling control data creation section 205 may create the traveling control data using data from a sensor such as radar, ultrasound, or LiDAR other than the cameras.

In the above examples, the display data creation section 204 and the traveling control data creation section 205 have been described as creating the two-dimensional map in their respective blocks. However, the two-dimensional map created in the display data creation section 204 may be used in the traveling control data creation section 205. Further, the two-dimensional map created in the traveling control data creation section 205 may be used in the display data creation section 204.

When the two-dimensional map is created in the traveling control data creation section 205, the high-definition map may be generated first. After that, the two-dimensional map may be created by projecting the high-definition map onto a certain plane.

7. Regarding Example of Hardware Configuration of Image Processing System (Vehicle Control System)

Next, an example of a hardware configuration of the image processing system (vehicle control system) 100, which performs the above-described processing, will be described with reference to FIG. 17.

FIG. 17 is a diagram illustrating an example of the hardware configuration that can be applied as the image processing system (vehicle control system) 100.

The configuration illustrated in FIG. 17 will be described.

A CPU (Central Processing Unit) 301 functions as the data processing section that performs various kinds of processes according to a program stored in a ROM (Read Only Memory) 302 or a storage section 308. For example, the CPU 301 performs processing based on the sequence described in the embodiment described above. A RAM (Random Access Memory) 303 stores the program to be executed by the CPU 301, data, and the like. These CPU 301, ROM 302, and RAM 303 are connected to each other by a bus 304.

The CPU 301 is connected to an input/output interface 305 via the bus 304. An input section 306 and an output section 307 are connected to the input/output interface 305. The input section 306 includes, for example, various kinds of switches, a keyboard, a touch panel, a mouse, a microphone, and, moreover, a status data obtainment section such as sensors, cameras, and a GPS. The output section 307 includes a display, a speaker, and the like.

It is noted that an imaging section (camera) 321 and a temperature sensor 322 are illustrated in the figure as constituent components of the input section 306. Moreover, a display section 323 is illustrated as a constituent component of the output section 307.

The CPU 301 receives commands, status data, and the like input from the input section 306, performs various kinds of processes, and outputs processing results to the output section 307, for example.

The storage section 308 connected to the input/output interface 305 includes, for example, a hard disk and the like and stores the program to be executed by the CPU 301 and various kinds of data. A communication section 309 functions as a transmission/reception section for data communication via a network such as the Internet or a local area network and communicates with external apparatuses.

A drive 310, which is connected to the input/output interface 305, drives a removable medium 311 such as a magnetic disk, an optical disc, a magneto-optical disc, or a semiconductor memory such as a memory card and records or reads data.

8. Summary of Configurations of Present Disclosure

The embodiment of the present disclosure has been described in detail above with reference to the specific embodiment. However, it is obvious that those skilled in the art can make modifications or substitutions to the embodiment without departing from the scope of the present disclosure. That is, the present invention has been disclosed in the form of exemplification and should not be construed in a limited manner. In order to determine the scope of the present disclosure, the claims should be taken into consideration.

It is noted that the technique disclosed in the present specification can have the following configurations.

(1) An image processing apparatus including:
a data processing section configured to receive an image captured by a camera that captures the image of surroundings of a vehicle and generate a two-dimensional map including objects in the surroundings of the vehicle,
in which the data processing section generates the two-dimensional map including an enlarged display object having an enlarged region set thereto, the enlarged region which, in case of an object with low position reliability among the objects in the two-dimensional map, extends around the object.

(2) The image processing apparatus according to (1), in which
the two-dimensional map includes a surround-view image that is an image observed from above the vehicle.

(3) The image processing apparatus according to (1) or (2), in which
the data processing section determines position reliability of each object on the basis of an image height of each object.

(4) The image processing apparatus according to any one of (1) to (3), in which
the data processing section determines that an object whose image height is equal to or greater than a predetermined image height threshold is an object with low position reliability.

(5) The image processing apparatus according to any one of (1) to (4), in which
the data processing section determines that an object whose image height is equal to or greater than a predetermined image height threshold is an object with low position reliability and places the object on the two-dimensional map as the enlarged display object having the enlarged region extending around the object set thereto, while determining that an object whose image height is not equal to or greater than the image height threshold is an object with high position reliability and placing the object on the two-dimensional map as a normal display object not having enlarged region extending around the object set thereto.

(6) The image processing apparatus according to any one of (1) to (5), in which
the data processing section outputs a surround-view image including the two-dimensional map to a display section.

(7) The image processing apparatus according to any one of (1) to (6), in which
the data processing section outputs the two-dimensional map to a vehicle control section configured to perform automated driving.

(8) The image processing apparatus according to any one of (1) to (7), in which
the vehicle control section selects a traveling route on which the vehicle does not contact the enlarged display object placed on the two-dimensional map and performs control to cause the vehicle to travel the traveling route.

(9) The image processing apparatus according to any one of (1) to (8), in which
the data processing section generates the two-dimensional map including an attention-region-set object having an attention region set thereto, the attention region which, in case of an object with low position reliability, extends around the object.

(10) The image processing apparatus according to any one of (1) to (9), in which
the data processing section generates the two-dimensional map including the enlarged display object having an enlargement ratio that varies depending on position reliability.

(11) The image processing apparatus according to any one of (1) to (10), in which
the data processing section generates the two-dimensional map including the objects each displayed in a color that varies depending on position reliability.

(12) The image processing apparatus according to any one of (1) to (11), in which
the data processing section generates the two-dimensional map including the objects each surrounded by a frame having a size that varies depending on position reliability.

(13) A vehicle control apparatus including:
a data processing section configured to receive an image captured by a camera that captures the image of surroundings of a vehicle and generate a two-dimensional map including objects in the surroundings of the vehicle; and
a vehicle control section configured to determine a traveling route by referring to the two-dimensional map generated by the data processing section and perform control to cause the vehicle to travel the traveling route,
in which the data processing section generates the two-dimensional map including an enlarged display object having an enlarged region set thereto, the enlarged region which, in case of an object with low position reliability among the objects in the two-dimensional map, extends around the object, and
the vehicle control section selects the traveling route on which the vehicle does not contact the enlarged display object placed on the two-dimensional map and performs the control to cause the vehicle to travel the traveling route.

(14) An image processing method performed by an image processing apparatus, the image processing apparatus including a data processing section configured to receive an image captured by a camera that captures the image of surroundings of a vehicle and generate a two-dimensional map including objects in the surroundings of the vehicle, the image processing method including:

by the data processing section, generating the two-dimensional map including an enlarged display object having an enlarged region set thereto, the enlarged region which, in case of an object with low position reliability among the objects in the two-dimensional map, extends around the object.

(15) A vehicle control method performed by a vehicle control apparatus, the vehicle control apparatus including a data processing section configured to receive an image captured by a camera that captures the image of surroundings of a vehicle and generate a two-dimensional map including objects in the surroundings of the vehicle, and a vehicle control section configured to determine a traveling route by referring to the two-dimensional map generated by the data processing section and perform control to cause the vehicle to travel the traveling route, the vehicle control method including:

by the data processing section, generating the two-dimensional map including an enlarged display object having an enlarged region set thereto, the enlarged region which, in case of an object with low position reliability among the objects in the two-dimensional map, extends around the object; and by the vehicle control section, selecting the traveling route on which the vehicle does not contact the enlarged display object placed on the two-dimensional map and performing the control to cause the vehicle to travel the traveling route.

(16) A program causing an image processing apparatus to perform image processing, the image processing apparatus including a data processing section configured to receive an image captured by a camera that captures the image of surroundings of a vehicle and generate a two-dimensional map including objects in the surroundings of the vehicle, the program causing the data processing section to generate the two-dimensional map including an enlarged display object having an enlarged region set thereto, the enlarged region which, in case of an object with low position reliability among the objects in the two-dimensional map, extends around the object.

(17) A program causing a vehicle control apparatus to perform a vehicle control process, the vehicle control apparatus including a data processing section configured to receive an image captured by a camera that captures the image of surroundings of a vehicle and generate a two-dimensional map including objects in the surroundings of the vehicle, and a vehicle control section configured to determine a traveling route by referring to the two-dimensional map generated by the data processing section and perform control to cause the vehicle to travel the traveling route, the program causing:

the data processing section to generate the two-dimensional map including an enlarged display object having an enlarged region set thereto, the enlarged region which, in case of an object with low position reliability among the objects in the two-dimensional map, extends around the object; and the vehicle control section to select the traveling route on which the vehicle does not contact the enlarged display object placed on the two-dimensional map and perform the control to cause the vehicle to travel the traveling route.

Further, the series of processes described in the specification can be performed by hardware, software, or a combination of hardware and software. In a case where the processes are performed by software, a program having processing sequences recorded thereon can be installed in a memory of a computer incorporated into dedicated hardware and then executed, or the program can be installed in a general-purpose computer capable of performing various kinds of processes and then executed. For example, the program can be recorded on a recording medium in advance. The program can be installed from the recording medium to the computer. Alternatively, the program can be received through a network such as a LAN (Local Area Network) or the Internet and then installed in a recording medium such as a built-in hard disk.

It is noted that various kinds of processes described in the specification may not only be performed in chronological order according to the description but also be performed in parallel or individually according to the processing capability of the apparatus performing the processes or when needed. Further, in the present specification, a system refers to a configuration in which a plurality of apparatuses is logically grouped and is not limited to a configuration in which individually configured apparatuses are provided in the same housing.

INDUSTRIAL APPLICABILITY

As described above, according to the configurations of one embodiment of the present disclosure, an apparatus and a method for generating a two-dimensional map or a surround-view image in which an object with low position reliability is set as an enlarged display object are realized.

Specifically, for example, a data processing section configured to receive an image captured by a camera that captures an image of surroundings of a vehicle and generate a two-dimensional map including objects in the surroundings of the vehicle is included. The data processing section generates the two-dimensional map or a surround-view image including an enlarged display object having an enlarged region set thereto, the enlarged region which, in case of an object with low position reliability, extends around the object. The data processing section determines that an object whose image height is equal to or greater than a predetermined image height threshold is an object with low position reliability, while determining that an object whose image height is not equal to or greater than the image height threshold is an object with high position reliability.

With these configurations, the apparatus and the method for generating the two-dimensional map or the surround-view image in which the object with low position reliability is set as the enlarged display object are realized.

REFERENCE SIGNS LIST

10 Vehicle
11 to 14 Camera
20 Road surface
30 Vertical pole

61 Region dividing line
71 Enlarged display object
72 Normal display object
73 Attention region display object
81 Normal display object
100 Image processing system (vehicle control system)
101 Control section
102 Vehicle control apparatus
103 Display apparatus
104 Input section
105 Storage section
106 Communication section
107 Vehicle information obtainment section
110 Data processing apparatus
111 Display image generation section
121L to B Camera
131L to B Temperature sensor
301 CPU
302 ROM
303 RAM
304 Bus
305 Input/output interface
306 Input section
307 Output section
308 Storage section
309 Communication section
310 Drive
311 Removable medium
321 Imaging section
322 Temperature sensor
323 Display section

The invention claimed is:

1. An image processing apparatus comprising:
a data processing section comprising a first processor and a first memory configured to receive an image captured by a camera comprising a temperature sensor that captures the image of surroundings of a vehicle and generate a two-dimensional map including objects in the surroundings of the vehicle, and
a vehicle control section comprising a second processor and a second memory engaged with the data processing section and configured to select a traveling route on which the vehicle does not contact the enlarged display object placed on the two-dimensional map and performs control to cause the vehicle to travel the traveling route,
wherein the data processing section determines a substantially circular dividing line between an inner region and an outer region, determines a height threshold associated with the substantially circular dividing line, receives a temperature of the camera from the temperature sensor, determines whether the temperature of the camera is within a predetermined temperature range, if the temperature of the camera is not within the predetermined temperature range, determines whether a height of at least one object in the outer region is greater than the height threshold, if the height of the at least one object is greater than the height threshold, sets a position reliability of the at least one object in the outer region to a low reliability, and generates the two-dimensional map including an enlarged display object having an enlarged region set thereto, the enlarged region which, in case of the object with low position reliability among the objects in the two-dimensional map, extends around the object.

2. The image processing apparatus according to claim 1, wherein the two-dimensional map includes a surround-view image that is an image observed from above the vehicle.

3. The image processing apparatus according to claim 1, wherein the data processing section determines position reliability of each object on a basis of an image height of each object.

4. The image processing apparatus according to claim 1, wherein
the data processing section determines that an object whose image height is equal to or greater than a predetermined image height threshold is an object with low position reliability.

5. The image processing apparatus according to claim 1, wherein the data processing section determines that an object whose image height is equal to or greater than a predetermined image height threshold is an object with low position reliability and places the object on the two-dimensional map as the enlarged display object having the enlarged region extending around the object set thereto, while determining that an object whose image height is not equal to or greater than the image height threshold is an object with high position reliability and placing the object on the two-dimensional map as a normal display object not having enlarged region extending around the object set thereto.

6. The image processing apparatus according to claim 1, wherein the data processing section outputs a surround-view image including the two-dimensional map to a display section.

7. The image processing apparatus according to claim 1, wherein the data processing section outputs the two-dimensional map to the vehicle control section configured to perform automated driving.

8. The image processing apparatus according to claim 1, wherein the data processing section generates the two-dimensional map including an attention-region-set object having an attention region set thereto, the attention region which, in case of an object with low position reliability, extends around the object.

9. The image processing apparatus according to claim 1, wherein the data processing section generates the two-dimensional map including the enlarged display object having an enlargement ratio that varies depending on position reliability.

10. The image processing apparatus according to claim 1, wherein the data processing section generates the two-dimensional map including the objects each displayed in a color that varies depending on position reliability.

11. The image processing apparatus according to claim 1, wherein the data processing section generates the two-dimensional map including the objects each surrounded by a frame having a size that varies depending on position reliability.

12. A vehicle control apparatus comprising:
a data processing section comprising a first processor and a first memory configured to receive an image captured by a camera comprising a temperature sensor that captures the image of surroundings of a vehicle and generate a two-dimensional map including objects in the surroundings of the vehicle; and
a vehicle control section comprising a second processor and a second memory engaged with the data processing section and configured to determine a traveling route by referring to the two-dimensional map generated by the data processing section and perform control to cause the vehicle to travel the traveling route, wherein the data processing section determines a substantially circular dividing line between an inner region and an outer region of the image, determines a height threshold associated with the substantially circular dividing line, receives a temperature of the camera from the temperature sensor, determines whether the temperature of the camera is within a predetermined temperature range, if the temperature of the camera is not within the predetermined temperature range, determines whether a height of at least one object in the outer region is greater than the height threshold, if the height of the at least one object is greater than the height threshold, sets a position reliability of the at least one object in the outer region to a low reliability, and generates the two-dimensional map including an enlarged display object having an enlarged region set thereto, the enlarged region which, in case of the object with low position reliability among the objects in the two-dimensional map, extends around the object, and the vehicle control section selects the traveling route on which the vehicle does not contact the enlarged display object placed on the two-dimensional map and performs the control to cause the vehicle to travel the traveling route.

13. An image processing method performed by an image processing apparatus, the image processing apparatus including a data processing section configured to receive an image captured by a camera comprising a temperature sensor that captures the image of surroundings of a vehicle and generate a two-dimensional map including objects in the surroundings of the vehicle and a vehicle control section engaged with the data processing section and configured to determine a traveling route by referring to the two-dimensional map generated by the data processing section and perform control to cause the vehicle to travel the traveling route, the image processing method comprising:

by the data processing section,
determining a substantially circular dividing line between an inner region and an outer region of the image,
determines a height threshold associated with the substantially circular dividing line,
receives a temperature of the camera from the temperature sensor,
determines whether the temperature of the camera is within a predetermined temperature range,
if the temperature of the camera is not within the predetermined temperature range,
determines whether a height of at least one object in the outer region is greater than the height threshold,
if the height of the at least one object is greater than the height threshold,
setting a position reliability of the at least one object in the outer region to a low reliability, and
generating the two-dimensional map including an enlarged display object having an enlarged region set thereto, the enlarged region which, in case of the object with low position reliability among the objects in the two-dimensional map, extends around the object.

14. A vehicle control method performed by a vehicle control apparatus, the vehicle control apparatus including
a data processing section comprising a first processor and a first memory configured to receive an image captured by a camera comprising a temperature sensor that captures the image of surroundings of a vehicle, determine a substantially circular dividing line between an inner region and an outer region of the image, determine a height threshold associated with the substantially circular dividing line, receives a temperature of the camera from the temperature sensor, determine whether the temperature of the camera is within a predetermined temperature range, if the temperature of the camera is not within the predetermined temperature range, determine whether a height of at least one object in the outer region is greater than the height threshold, if the height of the at least one object is greater than the height threshold, set a position reliability of the at least one object in the outer region to a low reliability, and generate a two-dimensional map including objects in the surroundings of the vehicle, and a vehicle control section comprising a second processor and a second memory engaged with the data processing section and configured to determine a traveling route by referring to the two-dimensional map generated by the data processing section and perform control to cause the vehicle to travel the traveling route, the vehicle control method comprising:

by the data processing section,
generating the two-dimensional map including an enlarged display object having an enlarged region set thereto, the enlarged region which, in case of the object with low position reliability among the objects in the two-dimensional map, extends around the object; and
by the vehicle control section,
selecting the traveling route on which the vehicle does not contact the enlarged display object placed on the two-dimensional map and performing the control to cause the vehicle to travel the traveling route.

15. A system comprising an image processing apparatus to perform image processing, the image processing apparatus including a camera, a temperature sensor, and a data processing section comprising a first processor and a first memory configured to receive an image captured by a camera that captures the image of surroundings of a vehicle, determine a substantially circular dividing line between an inner region and an outer region of the image, determine a height threshold associated with the substantially circular dividing line, receive a temperature of the camera from the temperature sensor, determine whether the temperature of the camera is within a predetermined temperature range, if the temperature of the camera is not within the predetermined temperature range, determine whether a height of at least one object in the outer region is greater than the height threshold, if the height of the at least one object is greater than the height threshold, set a position reliability of the at least one object in the outer region to a low reliability, and generate a two-dimensional map including objects in the surroundings of the vehicle, and a vehicle control section comprising a second processor and a second memory engaged with the data processing section and configured to determine a traveling route by referring to the two-dimensional map generated by the data processing section and perform control to cause the vehicle to travel the traveling route, the data processing section generating the two-dimensional map including an enlarged display object having an enlarged region set thereto, the enlarged region which, in case of the object with low position reliability among the objects in the two-dimensional map, extends around the object.

16. A system comprising a vehicle control apparatus to perform a vehicle control process, the vehicle control apparatus including
a data processing section comprising a first processor and a first memory configured to receive an image captured by a camera comprising a temperature sensor that captures the image of surroundings of a vehicle, determine a substantially circular dividing line between an inner region and an outer region of the image, determine a height threshold associated with the substantially circular dividing line, receive a temperature of the camera from the temperature sensor, determines whether the temperature of the camera is within a predetermined temperature range, if the temperature of the camera is not within the predetermined temperature range, determine whether a height of at least one object in the outer region is greater than the height threshold, if the height of the at least one object is greater than the height threshold, set a position reliability of the at least one object in the outer region to a low reliability, and generate a two-dimensional map including objects in the surroundings of the vehicle, and a vehicle control section comprising a second processor and a second memory configured to determine a traveling route by referring to the two-dimensional map generated by the data processing section and perform control to cause the vehicle to travel the traveling route, wherein:

the data processing section generates the two-dimensional map including an enlarged display object having an enlarged region set thereto, the enlarged region which, in case of an object with low position reliability among the objects in the two-dimensional map, extends around the object; and the vehicle control section selects the traveling route on which the vehicle does not contact the enlarged display object placed on the two-dimensional map and perform the control to cause the vehicle to travel the traveling route.

* * * * *